United States Patent
Fodor et al.

(10) Patent No.: US 12,349,074 B2
(45) Date of Patent: Jul. 1, 2025

(54) POWER CONTROL FOR THE SIDELINK CONTROL CHANNEL

(71) Applicant: Telefonaktiebolaget LM Ericsson (PUBL), Stockholm (SE)

(72) Inventors: Gabor Fodor, Hässelby (SE); Ricardo Blasco Serrano, Espoo (FI); Smriti Gopinath, Solna (SE); Wanlu Sun, San Diego, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 507 days.

(21) Appl. No.: 17/635,051

(22) PCT Filed: Aug. 3, 2020

(86) PCT No.: PCT/SE2020/050760
§ 371 (c)(1),
(2) Date: Feb. 14, 2022

(87) PCT Pub. No.: WO2021/034245
PCT Pub. Date: Feb. 25, 2021

(65) Prior Publication Data
US 2022/0295411 A1    Sep. 15, 2022

Related U.S. Application Data

(60) Provisional application No. 62/887,827, filed on Aug. 16, 2019.

(51) Int. Cl.
*H04W 52/14* (2009.01)
*H04L 1/00* (2006.01)
(Continued)

(52) U.S. Cl.
CPC ........... *H04W 52/14* (2013.01); *H04L 1/0003* (2013.01); *H04W 52/242* (2013.01); *H04W 52/367* (2013.01)

(58) Field of Classification Search
CPC . H04W 52/14; H04W 52/242; H04W 52/367; H04W 52/16; H04W 52/262; H04W 52/325; H04W 52/383; H04L 1/0003
See application file for complete search history.

(56) References Cited

U.S. PATENT DOCUMENTS

2018/0343626 A1    11/2018  Li et al.
2019/0097751 A1*   3/2019   Li .................. H04W 4/027
(Continued)

FOREIGN PATENT DOCUMENTS

EP    3316647 A1    5/2018
EP    3 515 126 A1  7/2019
(Continued)

OTHER PUBLICATIONS

Huwaei & HiSilcon, R1-1904691. Power Control and power sharing for V2X Sidelink, Apr. 8-12, 2019, 3GPP (Year: 2019).*
(Continued)

*Primary Examiner* — Habte Mered
(74) *Attorney, Agent, or Firm* — Baker Botts L.L.P.

(57) ABSTRACT

According to some embodiments, a method is performed by a wireless device. The method comprises obtaining a data channel transmit power for transmitting on a sidelink data channel to a receiving wireless device, obtaining a control channel transmit power for transmitting on a sidelink control channel, and transmitting on the sidelink data channel at the data channel transmit power and on the sidelink control channel at the control channel transmit power. In certain embodiments, the control channel transmit power is based on the data channel transmit power. In other embodiments, the control channel transmit power is determined independently of the data channel transmit power.

15 Claims, 14 Drawing Sheets

---

1402: obtaining a data channel transmit power for transmitting a sidelink data channel to a receiving wireless device 1404: obtaining a control channel transmit power for transmitting a sidelink control channel, wherein the control channel transmit power is determined independently of the data channel transmit power 1406: transmitting on the sidelink data channel at the data channel transmit power and on the sidelink control channel at the control channel transmit power

(51) Int. Cl.
*H04W 52/24* (2009.01)
*H04W 52/36* (2009.01)

(56) References Cited

U.S. PATENT DOCUMENTS

| | | | |
|---|---|---|---|
| 2019/0182859 A1 | 6/2019 | Khoryaev et al. | |
| 2019/0208476 A1* | 7/2019 | Wu | H04W 52/247 |
| 2020/0260386 A1* | 8/2020 | Ryu | H04W 76/14 |
| 2020/0396690 A1* | 12/2020 | Li | H04W 52/325 |
| 2022/0053428 A1* | 2/2022 | Hwang | H04W 52/367 |
| 2022/0086767 A1* | 3/2022 | Panteleev | H04W 52/383 |

FOREIGN PATENT DOCUMENTS

| | | |
|---|---|---|
| WO | 2015181778 A1 | 12/2015 |
| WO | 2018190623 A1 | 10/2018 |
| WO | 2020 210287 A1 | 10/2020 |

OTHER PUBLICATIONS

3GPP TSG RAN WG1 Meeting #97; Reno, USA; Source: Huawei, HiSilicon; Title: Sidelink physical layer procedures for NR V2X (R1-1906008)—May 13-17, 2019.
3GPP TSG RAN WG1 Meeting #97; Reno, USA; Source: Huawei, HiSilicon; Title: Power control and power sharing for V2X sidelink (R1-1906598)—May 13-17, 2019.
3GPP TSG RAN WG1 Meeting #97; Reno, USA; Source: LG Electronics; Title: Discussion on physical layer procedures for NR sidelink (R1-1907018)—May 13-17, 2019.
PCT International Search Report issued for International application No. PCT/SE2020/050760—Feb. 12, 2021.
PCT Written Opinion of the International Searching Authority issued for International application No. PCT/SE2020/050760—Feb. 12, 2021.
3GPP TSG RAN WG1 Meeting #96bis; Xi'an, China, Apr. 8-12, 2019; Agenda Item: 7.2.4.8; Source: Huawei, HiSilicon; Title: Power control and power sharing for V2X sidelink (R1-1904691).
3GPP TSG RAN WG1 Meeting #84; St. Julian's, Malta, Feb. 15-19, 2016; Agenda Item: 7.3.2.2.2; Source: Huawei, HiSilicon; Title: Power control for V2V (R1-160735).
Extended European Search Report issued for Application No. / Patent No. 20855038.4-1206 / 4014581 PCT/SE2020050760—Aug. 24, 2023.
European Patent Office Communication Pursuant to Article 94(3) EPC in EP Application No. 20 855 038.4-1206, dated Oct. 4, 2024.

\* cited by examiner

1502: configuring a wireless device with one or more power control parameters, wherein the wireless device uses the one or more power control parameters to determine a data channel transmit power and a control channel transmit power for transmitting in a sidelink to a receiving wireless device

Figure 15

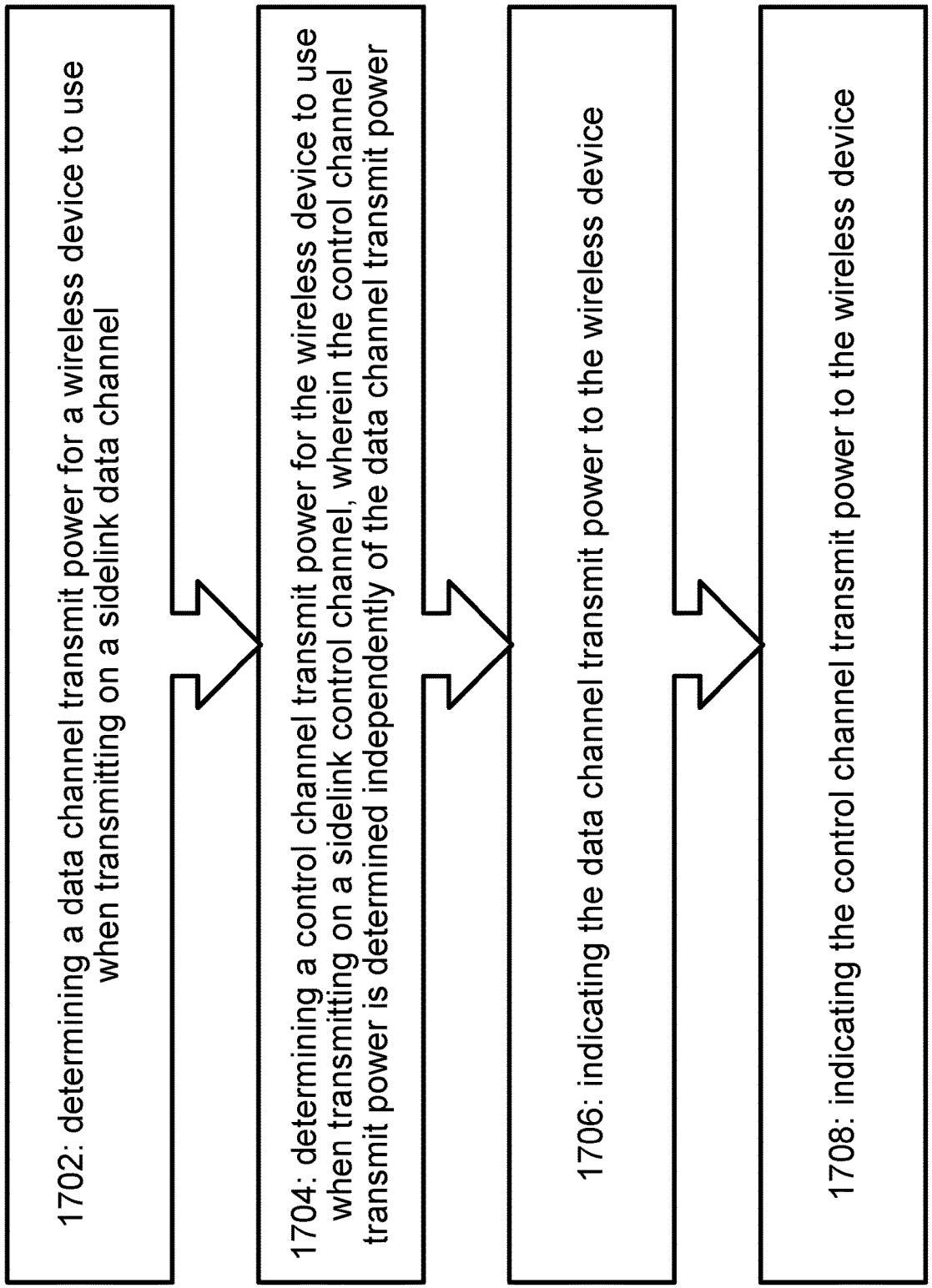

POWER CONTROL FOR THE SIDELINK CONTROL CHANNEL

PRIORITY

This nonprovisional application is a U.S. National Stage Filing under 35 U.S.C. § 371 of International Patent Application Serial No. PCT/SE2020/050760 filed Aug. 3, 2020 and entitled "Power Control for the Sidelink Control Channel" which claims priority to U.S. Provisional Patent Application No. 62/887,827 filed Aug. 16, 2019 both of which are hereby incorporated by reference in their entirety.

TECHNICAL FIELD

Certain embodiments of the present disclosure relate, in general, to power control for a sidelink channel.

BACKGROUND

Vehicle-to-Anything (V2X) Communications

The Third Generation Partnership Project (3GPP) refers to a group of organizations that develop mobile telecommunications standards, such as the Long Term Evolution (LTE) standard. Releases 14 and 15 of the 3GPP LTE standard have been extended with support of device-to-device (D2D) (specified as "sidelink" (SL)) features targeting vehicular communications, collectively referred to as V2X. Besides vehicle-to-vehicle (V2V) communication, V2X includes V2P (vehicle-to-pedestrian or pedestrian-to-vehicle), V2I (vehicle-to-infrastructure), etc., as shown in FIG. 1.

These direct communication functionalities are built upon LTE D2D, also known as ProSe (Proximity Services), as first specified in the Release 12 of LTE, and include many important enhancements targeting the specific characteristics of vehicular communications. For example, LTE V2X operation is possible with and without network coverage and with varying degrees of interaction between the UEs (user equipment) and the NW (network), including support for standalone, network-less operation.

Rel-14 V2X aims at providing basic safety-related use cases such as forward collision warning, emergency braking, and roadwork warning. This was achieved by technical solutions making LTE a suitable technology for meeting the requirements of the European Telecommunications Standards Institute (ETSI) for delivering traffic safety messages such as Cooperative Awareness Messages (CAMs) and Decentralized Environmental Notification Messages (DENMs). LTE Rel-15 enhanced the Rel-14 V2X features to support more advanced use cases, categorized into four use case groups: vehicles platooning, extended sensors, advanced driving, and remote driving. However, the Rel-15 enhancements were limited by backward compatibility with Rel-14 V2X, and therefore were not be able to fulfil all the requirements of the advanced V2X services.

The on-going 5th Generation (5G) V2X standardization efforts in Release 16 aim at enhancing 3GPP new radio (NR) system to meet the stringent Quality of Service (QoS) requirements (e.g., in terms of latency and reliability) of the aforementioned advanced V2X services that are beyond the capabilities of LTE V2X Rel-14 and Rel-15. This requires a new NR sidelink design for V2X. A key technical feature of the NR sidelink for V2X is the capability to support physical-layer unicast and groupcast (or multicast) (as compared to the broadcast-only LTE sidelink). One of the physical layer procedures of interest for the different cast modes is transmit power control.

Power Control in Cellular Networks and for Device-to-Device Communications

In cellular networks, including 3GPP LTE and NR networks, transmit power control is exercised for uplink (UL) transmissions. The 3GPP specifications enable a user equipment (UE) to set the transmit power by taking into account the path loss, number of scheduled resource blocks, targeted signal-to-noise ratio (SNR) at the base station and other parameters. Specifically, uplink power control is set by the UE according to a set of equations that contain a number of parameters related to large scale fading (estimated path loss), number of scheduled resource blocks, target SNR and other parameters. This rather general formula is often referred to as the fractional path loss (FRPL) compensation formula, which can be configured separately for the physical uplink shared channel (PUSCH) and the physical uplink control channel (PUCCH).

A similar path loss compensating formula can be used for power control in network-controlled device-to-device communications over the sidelink (see below equation 1). When the FRPL-based power control is employed for sidelink transmissions, the power control scheme can optionally take into account the path loss to the serving base station and the interference caused to the surrounding cellular network and nodes and UEs, in addition to the path loss between the communication devices. The FRPL equation is shown below:

$$P_{Tx}=P_0-\alpha G+\Delta_{TF}+f(\Delta_{TPC})+10 \log M, \quad (1)$$

where $P_{Tx}$ is the UE transmit power, $P_0$ is a base power level used to control the SNR target, G is the estimated path gain between the UE and the base station, $\Delta_{TF}+f(\Delta_{TPC})$ is a dynamic offset depending on the transport format (TF, referring to the modulation and coding scheme (MCS)) and transmit power commands (TPC) sent by the network, and M is the number of scheduled resource blocks. This formula may be applied to achieve fixed power, fixed signal-to-interference-plus-noise ratio (SINR) target, open loop with path-loss compensation, and closed loop power control schemes.

Modes of Operation of the NR Sidelink

Like in LTE sidelink, there are two operation modes for NR sidelink:

Network-based Mode 1 (Mode 3 in LTE V2X), in which the network selects the resources and other transmit parameters assigned to sidelink UEs by means of scheduling grants. In some cases, the network may control every single transmission parameter. In other cases, the network may select the resources used for transmission but may give the transmitter the freedom to select some of the transmission parameters, possibly with some restrictions.

Autonomous Mode 2 (Mode 4 in LTE V2X), in which the UEs autonomously select the resources and other transmit parameters. In this mode, there may be no intervention by the network (e.g., out of coverage, unlicensed carriers without a network deployment) or very minimal intervention by the network (e.g., configuration of pools of resources, etc.). Mode 2 resource allocation is based on resource reservation and sensing of these reservations by UEs to predict future resource utilization.

Power Control in NR Uplink and NR Sidelink

Power Control for NR Uplink

As with LTE, in NR the transmit power in the uplink (from the UE to the network) is often controlled by the gNB (5G NR next generation NodeB base station) (see the FRPL equation (1) above, in which parameters can be set and the TPC command can control the transmit power). This serves two main purposes:

- To ensure that the received power (at the network) of the uplink signal is at a satisfactory level to allow for successful decoding of the signal.
- At the same time, the transmit power should not be unnecessarily high as that would cause unnecessarily high interference to other uplink signals.

LTE and NR uplink power control are based on a combination of:

- Open-loop power control: the UE estimates the uplink pathloss based on measuring signals in the downlink and sets the transmit power accordingly.
- Closed-loop power control: the network measures received uplink powers. Based on these past measurements the network controls the transmit power of the UE by sending power-control commands to the UE.

In a simplified term, the baseline power control algorithm in the uplink (UL) can be expressed as:

$$P = \min\{P_{max}, P'_{max}(PL_{UL}, P_0)\}, \quad (2)$$

where the P denotes the transmit power and $P_{max}$ denotes the maximum allowed transmit power per carrier. $P'_{max}(PL_{UL}, P_0)$ is a collective term taking into account the impacts of uplink path loss $PL_{UL}$, the desired received power $P_0$ (configurable by the network), and several other factors such as the modulation and coding scheme (MCS) and a power-control command in the case of closed-loop power control.

Power Control for NR Sidelink

Transmit power control for sidelink serves the following purposes:

- It helps to manage the UE power consumption, which may be important for certain UE types (e.g., pedestrian UE). This aspect is crucial for resource constrained devices with limited battery power and may be less important for vehicle UEs.
- It helps to adjust the transmission range to the intended receiver and ensure good reception at the receiver, at the same time limiting the interference caused towards non-intended receivers. It is especially important for D2D or sidelink operation in the licensed spectrum when sidelink and cellular resources overlap.

To achieve the above two goals and given what is done for the UL power control, it is natural to base the sidelink power control procedure on the pathloss estimated between the transmitting (TX) UE and gNB (if TX UE is in coverage) and also on the pathloss between TX UE and receiving (RX) UE. Hence, the sidelink transmit power can be represented by the following generic formula:

$$P = \min\{P_{max}, P'_{max}(PL_{UL}), P_{req}(PL_{SL})\}, \quad (3)$$

Where $P_{max}$ is the maximum allowed transmit power configured by the higher layers in the protocol stack.

$P'_{max}(PL_{UL})$ is the maximum allowed transmit power when considering the interference to UL reception, where $PL_{UL}$ is the pathloss between TX UE and the gNB. This term is introduced to mitigate the interference to UL reception at the gNB.

$P_{req}(PL_{SL})$ is the required transmit power calculated based on the sidelink pathloss $PL_{SL}$ between TX UE and RX UE in order to guarantee reliable reception(s).

The formula in Equation (3) reflects the current agreements in 3GPP RAN1 (Radio Access Network working group 1) on open-loop power control (OLPC) of transmit power when both downlink pathloss and sidelink (SL) pathloss are considered. RAN1 has also agreed not to support closed-loop power control in Rel-16 NR SL. For OLPC, $P_{req}$ is calculated using the FRPL formula given by equation (1) excluding the dynamic offset $\Delta_{TF}$+f ($\Delta_{TPC}$) and $PL_{SL}$ is the inverse of path gain G. Compared to the UL power control in (2), the sidelink (SL) power control in (3) decouples the required (or desired) transmit power from $P'_{max}$ because the desired receiver is another UE. Also note that in LTE sidelink, due to broadcast transmissions, only $P_{max}$ and $P'_{max}$ ($PL_{UL}$) are considered since the set of target RX UEs is too large for each individual sidelink $P_{req}$ to be relevant. However, for NR sidelink unicast and groupcast, different parameters can be used to determine $P_{req}$, enabling the transmit UE to adjust its transmit power accordingly. The pathloss $PL_{SL}$ is determined by the TX UE based on Reference Signal Received Power (RSRP) measurements that are reported back by the RX UE. Typically, larger distances between TX UE and RX UE means higher pathloss and hence increasing the transmit power to cover the distance. As can be noted in equation (3), the sidelink transmit power $P_{req}$ is limited by the $P_{max}$ and $P'_{max}$ ($PL_{UL}$) terms, which we will refer together as $P_{cmax}$ in the rest of the disclosure.

Power Allocation for Sidelink Physical Channels

In LTE V2X, the Physical sidelink control channel (PSCCH) carries scheduling control information such as scheduling assignment and is required by the UE to properly detect and decode the corresponding data channel, that is the Physical sidelink shared channel (PSSCH). PSSCH carries actual data payload, channel state information (CSI) reports, and discovery messages for sidelink communication.

The control information is of broadcast nature (e.g., all surrounding UEs may receive and decode the control information carried in PSCCH) and especially for autonomous mode operation, it is important that all the neighboring UEs receive the transmitted packets for resource sensing and allocation purposes. Power allocation for the sidelink data channel (PSSCH) and control channel (PSCCH) is proportional to the allocated bandwidth along with a constant 3 dB power boost for the PSCCH. The power boosting is done to improve PSCCH coverage and the likelihood of decoding the PSCCH packets by surrounding UEs.

In contrast to LTE sidelink, NR supports time domain multiplexing of PSCCH and its associated PSSCH. As shown in FIG. 2, PSCCH is always present at the beginning of the slot (or subframe) occupying a few Orthogonal Frequency Division Multiplexing (OFDM) symbols (e.g., <3 symbols). In particular, FIG. 2 illustrates an example of PSCCH and PSSCH multiplexing within a subframe containing 14 OFDM symbols. In this arrangement, the resource elements (subcarriers) of a single OFDM symbol carry PSSCH and PSCCH information. In this case, power boosting of the PSCCH must be done in such a way that total transmit power within the slot remains constant to not introduce a transient period.

SUMMARY

There currently exist certain challenges. In NR sidelink, PSCCH and PSSCH do not have distinct (dedicated) resource pools and may share symbols within a slot or subframe period. While the control PSCCH part is to be received by UEs that fall within communication range, the data PSSCH of unicast/groupcast sessions is targeted towards one or more UE(s) (intended receiver UEs). Using power boosting in the symbols carrying PSCCH to achieve higher probability of decoding implies different power levels for the control and data symbols but it introduces a transient period that causes performance degradation.

Existing solutions employing power boosting suffer from at least the following problems:
- they cause transient problems at the transmit power amplifiers;
- they do not take into account SNR or SINR targets and other parameters as set by the FRPL formula Eq. 1 for the PSSCH and PSCCH; and
- they are not applicable for unicast/groupcast transmissions because the existing power boosting mechanism is not adaptive of varying transmission requirements such as the number of target UE receivers, transmission range, etc. that vary with unicast/groupcast sessions.

One root cause for these problems is that current solutions do not distinguish power control for a broadcasting PSCCH and a unicasting or groupcasting PSSCH.

Certain aspects of the present disclosure and their embodiments may provide solutions to these or other challenges. According to the disclosure, the transmit power of the PSCCH depends on the output of OLPC formula Eq. (3) and may be increased (boosted) over this output value. Specifically, if OLPC results in a low TX power value, then more boosting may be applied on PSCCH at the expense of power allocated to the PSSCH. If OLPC results in a high TX value, then less boosting may be applied.

Note that the FRPL Eq. (1), which is a part of OLPC, incorporates the base power level (P0), which depends on the estimated path loss towards an (or a few) intended receiver(s) of the PSSCH. According to the disclosure, the PSCCH transmit power is related to the PSSCH transmit power by using the output of Eq. (1) as a basis for the PSCCH transmit power level. According to the disclosure, the PSCCH transmit power level is determined such that the boosting term over the base power level is set such that problems discussed above are taken into account.

Additionally, in certain embodiments, a power boosting term may be included in the FRPL formula, such that the FRPL equation produces a base value which may be higher than the existing FRPL TX power designed to set the PSSCH transmit power.

In this manner, this disclosure contemplates enhancements to sidelink power control by combining the power control procedure with objectives and constraints that reflect that the sidelink power controls for the PSSCH and PSCCH are markedly different and different power levels for the PSSCH and PSCCH may cause transient problems at the power amplifiers of the transmitting UEs. Accordingly, the disclosure discusses using the OLPC-set transmit power as a base-line transmit power and potentially boosting the PSCCH transmit power depending on the output of the OLPC, total power budget, and the constraints set by transmitting power amplifier capabilities.

There are, proposed herein, various embodiments which address one or more of the issues disclosed herein.

According to certain embodiments, a method performed by a wireless device comprises obtaining a data channel transmit power for transmitting on a sidelink data channel to a receiving wireless device, obtaining a control channel transmit power for transmitting on a sidelink control channel, and transmitting on the sidelink data channel at the data channel transmit power and on the sidelink control channel at the control channel transmit power. The control channel transmit power is based on the data channel transmit power.

According to certain embodiments, a computer program comprises instructions which when executed on a computer perform steps comprising obtaining a data channel transmit power for transmitting on a sidelink data channel to a receiving wireless device, obtaining a control channel transmit power for transmitting on a sidelink control channel, and transmitting on the sidelink data channel at the data channel transmit power and on the sidelink control channel at the control channel transmit power. The control channel transmit power is based on the data channel transmit power.

According to certain embodiments, a wireless device comprises processing circuitry and power supply circuitry. The processing circuitry is configured to obtain a data channel transmit power for transmitting on a sidelink data channel to a receiving wireless device, obtain a control channel transmit power for transmitting on a sidelink control channel, and transmit on the sidelink data channel at the data channel transmit power and on the sidelink control channel at the control channel transmit power. The control channel transmit power is based on the data channel transmit power. The power supply circuitry configured to supply power to the wireless device.

Any of the method, the computer program, and/or the wireless device described in the previous paragraphs may include one or more additional features, such as one or more of the following:

In some embodiments, the control channel transmit power is determined at the wireless device. Alternatively, in some embodiments, the control channel transmit power is received via signalling from a network node.

Similarly, in some embodiments, the data channel transmit power is determined at the wireless device. Alternatively, in some embodiments, the data channel transmit power is received via signalling from a network node.

In some embodiments, the control channel transmit power is determined based on adding a boost value to the data channel transmit power. For example, in some embodiments, the boost value depends on a calculation that is based at least in part on an estimated path loss between the wireless device and the receiving wireless device.

In some embodiments, the boost value is based on one or more of a modulation order, a coding rate, or a target transmission range of the sidelink control channel.

In some embodiments, possible values for the data channel transmit power are divided into power intervals. The control channel transmit power is determined based on which power interval the data channel transmit power falls into. As an example, in some embodiments, each of the power intervals corresponds to a respective boost value, and the control channel transmit power is determined based on adding the data channel transmit power and a boost value that corresponds to the power interval into which the data channel transmit power falls. As another example, in some embodiments, each of the power intervals corresponds to a respective range of boost values, and the control channel transmit power is determined based on adding the data channel transmit power and a boost value selected from the range of boost values corresponding to the power interval into which the data channel transmit power falls.

In some embodiments, the power intervals are configured by a network node communicating with the wireless device. In other embodiments, the power intervals are preconfigured.

In some embodiments, the control channel transmit power is equal to the data channel transmit power when the data channel transmit power exceeds a predetermined threshold value.

In some embodiments, the data channel transmit power varies based on whether the sidelink data channel is multiplexed with the sidelink control channel.

In some embodiments, the data channel transmit power is reduced when a sum of the data channel transmit power and the control channel transmit power exceeds a maximum transmit power. The data channel transmit power reduced such that it is equal to or less than the difference between the maximum transmit power and the control channel transmit power.

In some embodiments, a first group of one or more symbols is used to transmit on both the sidelink data channel (at the data channel transmit power) and the sidelink control channel (at the control channel transmit power). A second group of one or more symbols is used to transmit on only the sidelink data channel at a second data channel transmit power determined by adding the data channel transmit power and the control channel transmit power. In some embodiments, the second group of one or more symbols are adjacent symbols within a same slot or subframe.

According to certain embodiments, a method performed by a wireless device comprises obtaining a data channel transmit power for transmitting on a sidelink data channel to a receiving wireless device, obtaining a control channel transmit power for transmitting on a sidelink control channel, and transmitting on the sidelink data channel at the data channel transmit power and on the sidelink control channel at the control channel transmit power. The control channel transmit power is determined independently of the data channel transmit power.

According to certain embodiments, a computer program comprises instructions which when executed on a computer perform steps comprising obtaining a data channel transmit power for transmitting on a sidelink data channel to a receiving wireless device, obtaining a control channel transmit power for transmitting on a sidelink control channel, and transmitting on the sidelink data channel at the data channel transmit power and on the sidelink control channel at the control channel transmit power. The control channel transmit power is determined independently of the data channel transmit power.

According to certain embodiments, a wireless device comprises processing circuitry and power supply circuitry. The processing circuitry is configured to obtain a data channel transmit power for transmitting on a sidelink data channel to a receiving wireless device, obtain a control channel transmit power for transmitting on a sidelink control channel, and transmit on the sidelink data channel at the data channel transmit power and on the sidelink control channel at the control channel transmit power. The control channel transmit power is determined independently of the data channel transmit power. The power supply circuitry configured to supply power to the wireless device.

Any of the method, the computer program, and/or the wireless device described in the previous paragraphs may include one or more additional features, such as one or more of the following:

In some embodiments, the control channel transmit power is determined at the wireless device. Alternatively, in some embodiments, the control channel transmit power is received via signalling from a network node.

Similarly, in some embodiments, the data channel transmit power is determined at the wireless device. Alternatively, in some embodiments, the data channel transmit power is received via signalling from a network node.

In some embodiments, each MCS that is usable by the wireless device is associated with a respective transmission power value, and the transmission power value associated with the MCS to be used for transmitting from the wireless device to the receiving wireless device is selected as the control channel transmit power.

In some embodiments, each MCS that is usable by the wireless device is associated with a range of transmission power values, and one of the transmission power values in the range of transmission power values associated with the MCS to be used for transmitting from the wireless device to the receiving wireless device is selected as the control channel transmit power.

In some embodiments, the control channel transmit power is determined based on at least a target transmission range for the wireless device and an MCS for transmitting to the receiving wireless device.

In some embodiments, the association of MCS with a transmission power value or range of transmission power values is configured by a network node communicating with the wireless device. In other embodiments, the association of MCS with a transmission power value or range of transmission power values is preconfigured.

In some embodiments, when a sum of the data channel transmit power and the control channel transmit power exceeds a maximum transmit power, the data channel transmit power is reduced such that it is equal to or less than the difference between the maximum transmit power and the control channel transmit power. In some embodiments, the maximum transmit power varies over the duration of the transmission by the wireless device and the control channel transmit power is adjusted as the maximum transmit power changes.

In some embodiments the MCS of the sidelink control channel is adjusted based on the control channel transmit power.

In some embodiments, possible values of the control channel transmit power are divided into power intervals, and the MCS is adjusted based on which power interval the control channel transmit power falls into.

According to certain embodiments, a method performed by a network node comprises configuring a wireless device with one or more power control parameters that the wireless device uses to determine a data channel transmit power and a control channel transmit power for transmitting on a sidelink to a receiving wireless device.

According to some embodiments, a computer program comprises instructions which when executed on a computer perform steps comprising configuring a wireless device with one or more power control parameters that the wireless device uses to determine a data channel transmit power and a control channel transmit power for transmitting on a sidelink to a receiving wireless device.

According to some embodiments, a network node comprises processing circuitry and power supply circuitry. The processing circuitry is configured to configure a wireless device with one or more power control parameters that the wireless device uses to determine a data channel transmit power and a control channel transmit power for transmitting on a sidelink to a receiving wireless device. The power supply circuitry is configured to supply power to the network node.

Any of the method, the computer program, and/or the network node described in the previous paragraphs may include one or more additional features, such as one or more of the following:

In some embodiments, the one or more control parameters are used by the wireless device to determine a fractional path loss compensation. In some embodiments, a target energy per bit or target energy per resource element is set for the sidelink control channel. In some embodiments, the target energy per bit or target energy per resource element is independent from the fraction path loss compensation.

In some embodiments, the wireless device is configured with power intervals indicating possible values for the data channel transmit power. The power intervals enable the wireless device to determine the control channel transmit power based on which power interval the data channel transmit power falls into.

Certain embodiments communicate a configuration that indicates an association of an MCS and a target transmission range that the wireless device is to use for transmitting to the receiving wireless device. The configuration enables the wireless device to determine the control channel transmit power based at least on the target transmission range and the determined MCS.

According to certain embodiments, a method performed by a network node comprises determining a control channel transmit power for a wireless device to use when transmitting on a sidelink control channel. The method further comprises indicating the control channel transmit power to the wireless device. The control channel transmit power is based on a data channel transmit power that the wireless device is to use when transmitting on a sidelink data channel.

According to certain embodiments, a computer program comprises instructions which when executed on a computer perform steps comprising determining a control channel transmit power for a wireless device to use when transmitting on a sidelink control channel. The steps further comprise indicating the control channel transmit power to the wireless device. The control channel transmit power is based on a data channel transmit power that the wireless device is to use when transmitting on a sidelink data channel.

According to some embodiments, a network node comprises processing circuitry and power supply circuitry. The processing circuitry is configured to determine a control channel transmit power for a wireless device to use when transmitting on a sidelink control channel. The processing circuitry is further configured to indicate the control channel transmit power to the wireless device. The control channel transmit power is based on a data channel transmit power that the wireless device is to use when transmitting on a sidelink data channel. The power supply circuitry is configured to supply power to the network node.

Any of the method, the computer program, and/or the network node described in the previous paragraphs may include one or more additional features, such as one or more of the following:

In some embodiments, the method, computer product, or network node further determines the data channel transmit power for the wireless device to use when transmitting on the sidelink data channel and indicates the data channel transmit power to the wireless device.

In some embodiments, determining the control channel transmit power comprises adding a boost value to the data channel transmit power. In some embodiments, the boost value depends on a calculation. The calculation is based at least in part on an estimated path loss between the wireless device and the receiving wireless device.

In some embodiments, possible values for the data channel transmit power are divided into power intervals, and the control channel transmit power is based on which power interval the data channel transmit power falls into.

In some embodiments, each of the power intervals corresponds to a respective boost value. Determining the control channel transmit power comprises adding the data channel transmit power and a boost value that corresponds to the power interval into which the data channel transmit power falls.

In some embodiments, each of the power intervals corresponds to a respective range of boost values. Determining the control channel transmit power comprises determining a boost value in the range of boost values corresponding to the power interval into which the data channel transmit power falls and adding the determined boost value to the data channel transmit power to obtain the control channel transmit power.

In some embodiments, the boost value is based on one or more of a modulation order, a coding rate, or a target transmission range of the sidelink control channel.

In some embodiments, the control channel transmit power is equal to the data channel transmit power when the data channel transmit power exceeds a predetermined threshold value.

In some embodiments, the data channel transmit power varies based on whether the sidelink data channel is multiplexed with the sidelink control channel.

In some embodiments, when a sum of the data channel transmit power and the control channel transmit power exceeds a maximum transmit power, the data channel transmit power is reduced such that it is equal to or less than the difference between the maximum transmit power and the control channel transmit power.

In some embodiments, the method, computer program, or network node indicates to use a first group of one or more symbols to transmit both on the sidelink data channel at the data channel transmit power and on the sidelink control channel at the control channel transmit power. The method, computer program, or network node further indicates to use a second group of one or more symbols to transmit on only the sidelink data channel at a second data channel transmit power determined by adding the data channel transmit power and the control channel transmit power. In some embodiments, the first group of one or more symbols and the second group of one or more symbols are adjacent symbols within a same slot or subframe.

According to certain embodiments, a method performed by a network node comprises determining a control channel transmit power for a wireless device to use when transmitting on a sidelink control channel. The method further comprises indicating the control channel transmit power to the wireless device. The control channel transmit power is determined independently of a data channel transmit power that the wireless device is to use when transmitting on a sidelink data channel.

According to certain embodiments, a computer program comprises instructions which when executed on a computer perform steps comprising determining a control channel transmit power for a wireless device to use when transmitting on a sidelink control channel. The steps further comprise indicating the control channel transmit power to the wireless device. The control channel transmit power is determined independently of a data channel transmit power that the wireless device is to use when transmitting on a sidelink data channel.

According to some embodiments, a network node comprises processing circuitry and power supply circuitry. The processing circuitry is configured to determine a control channel transmit power for a wireless device to use when transmitting on a sidelink control channel. The processing circuitry is further configured to indicate the control channel transmit power to the wireless device. The control channel transmit power is determined independently of a data channel transmit power that the wireless device is to use when transmitting on a sidelink data channel. The power supply circuitry is configured to supply power to the network node.

Any of the method, the computer program, and/or the network node described in the previous paragraphs may include one or more additional features, such as one or more of the following:

In some embodiments, the method, computer program, or network node determines the data channel transmit power for the wireless device to use when transmitting on the sidelink data channel and indicates the data channel transmit power to the wireless device.

In some embodiments, each MCS that is usable by the wireless device is associated with a respective transmission power value. The method, computer program, or network node determines the MCS that the wireless device is to use when transmitting to a receiving wireless device and selects the transmission power value associated with the determined MCS as the control channel transmit power.

In some embodiments, each MCS that is usable by the wireless device is associated with a range of transmission power values. The method, computer program, or network node determines the MCS that the wireless device is to use when transmitting to a receiving wireless device and selects a power value from the range of transmission power values associated with the determined MCS as the control channel transmit power.

Certain embodiments determine a target transmission range for the wireless device, determine an MCS that the wireless device is to use for transmitting to the receiving wireless device, and determine the control channel transmit power based at least on the target transmission range and the determined MCS.

In some embodiments, when a sum of the data channel transmit power and the control channel transmit power exceeds a maximum transmit power, the data channel transmit power is reduced such that it is equal to or less than the difference between the maximum transmit power and the control channel transmit power.

In some embodiments, the maximum transmit power varies over the duration of the transmission by the wireless device, and the method, computer program or network node adjust the control channel transmit power as the maximum transmit power changes.

Certain embodiments adjust the MCS of the sidelink control channel based on the control channel transmit power. In some embodiments, possible values of the control channel transmit power are divided into power intervals, and adjusting the MCS is based on which power interval the control channel transmit power falls into.

Certain embodiments may provide one or more of the following technical advantage(s). For example, certain embodiments take into account the parameters that are necessary for setting the proper transmit power level for the PSSCH and ensure good coverage for the PSCCH while taking into account constraints on transients when the PSSCH and PSCCH symbols are within the same slot or subframe and/or when they are contained within the same OFDM symbol. As a result, certain embodiments result in improved PSCCH coverage, which yields better resource allocation awareness (by enabling surrounding UEs to sense control information) among a wider set of UEs other than the intended receiver(s) of the PSSCH. UEs may also construct a map of available resources that can be used for future transmissions. Furthermore, certain embodiments also reduce the probability of collisions and back-off related delays, and thereby improve the system throughput.

BRIEF DESCRIPTION OF THE DRAWINGS

For a more complete understanding of the disclosed embodiments and their features and advantages, reference is now made to the following description, taken in conjunction with the accompanying drawings, in which:

FIG. 15 is a flowchart illustrating a method performed by a network node that facilitates power control for a wireless device transmitting on a sidelink channel, in accordance with certain embodiments.

FIG. 17 is a flowchart illustrating a method performed by a network node that facilitates power control for a wireless device transmitting on a sidelink channel, in accordance with certain embodiments.

DETAILED DESCRIPTION

Figure 1:
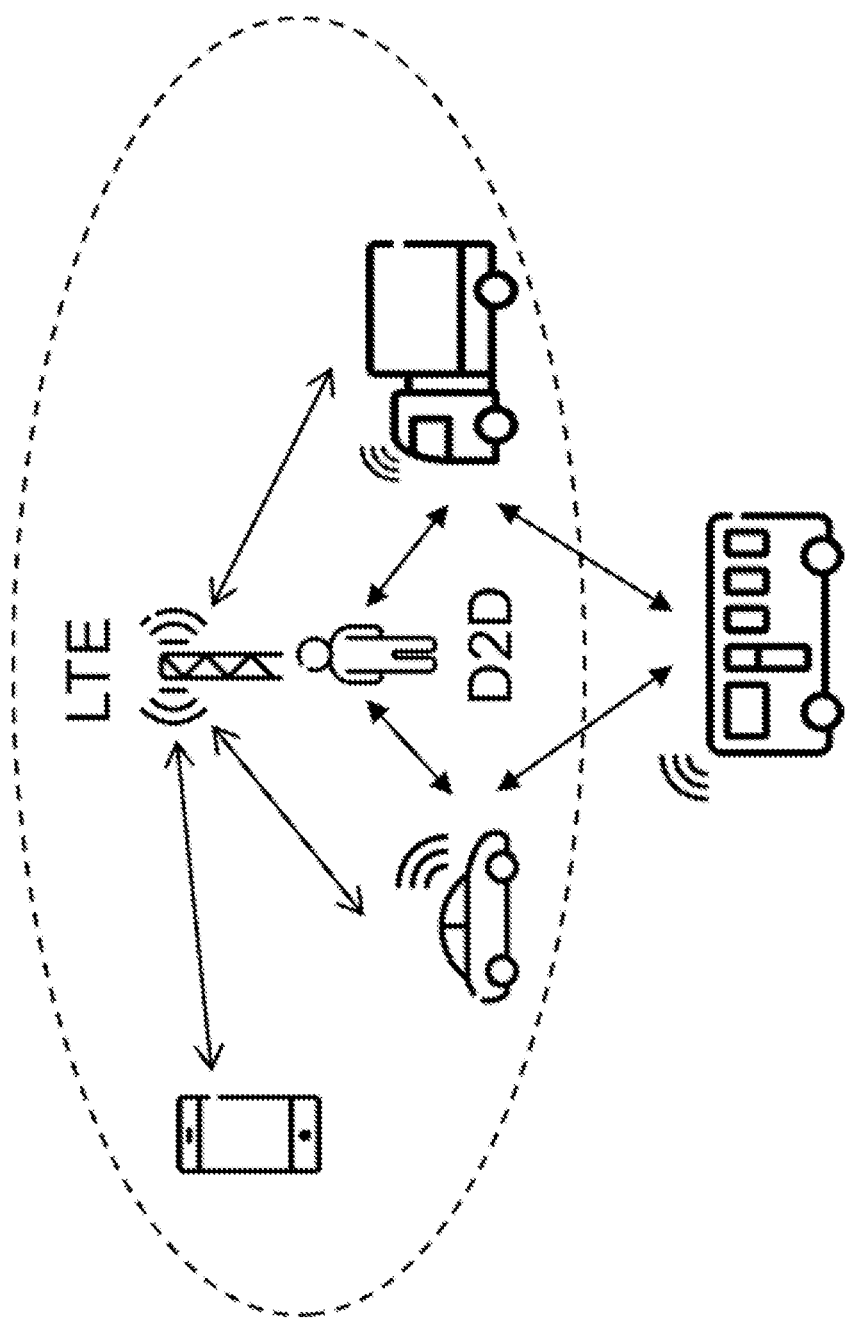
FIG. 1 illustrates an example of device-to-device communications in a wireless network, in accordance with certain embodiments.
Figure 2:
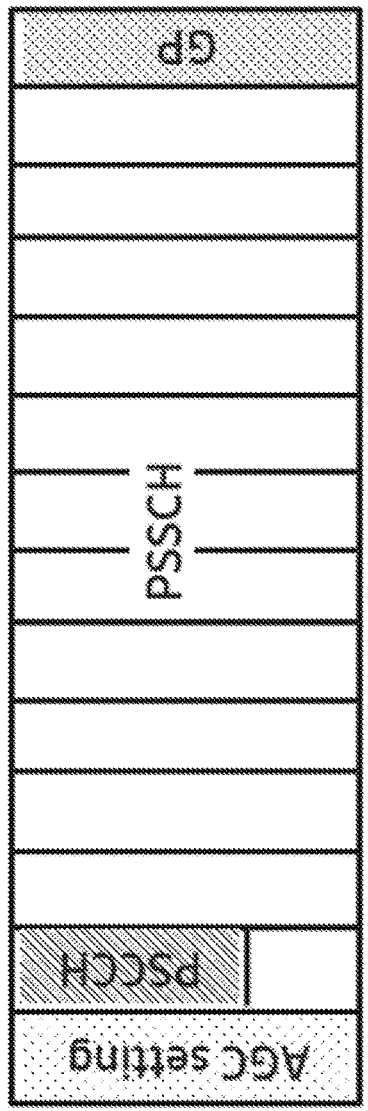
FIG. 2 illustrates an example of a slot (or subframe), in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The disclosure discussed herein is suitable for any radio access technology (RAT) (e.g., any LTE or NR network technology, etc.) with a device-to-device (D2D) mode. Moreover, although in certain examples use the terms PSCCH and PSSCH, the examples can be generalized to other types of control channel and data channel, respectively.

Procedure for Setting the PSSCH and PSCCH Tx Power Levels

According to certain embodiments, the following steps may be executed (not necessarily in this order) by a network (NW) node (when/if the UE is in coverage) controlling or assisting the operation of the transmitting UE:

The NW node configures the UE to a default set of values, including P0, α, ΔTF, and, optionally, a new term in the FRPL equation that controls the power boosting of the PSCCH;

The NW may optionally set a target energy per bit or corresponding target energy per resource element for the PSCCH. Notice that this target value is independent of the FRPL.

According to certain embodiments, the following steps may be executed (not necessarily in this order) by the transmitting UE (described for unicast, while extending it to groupcast is straightforward):

The UE obtains an estimate of the path gain between itself and the receiving UE;

When the UE is scheduled on a certain number of resource blocks (M), it executes the FRPL equation and determines the base power level for the PSSCH;

The UE determines the transmit power level for the PSSCH based on (power control) formula and based on this, the power level for the PSCCH:

The power level for the PSCCH may be set by applying a boosting to the power level or power spectral density of the PSSCH. In some cases, to achieve a bigger boosting, the power level for the PSCCH may be set by applying a boosting to the power level or power spectral density of the PSSCH value determined based on the formula.

Alternatively, the PSCCH transmit power could also be set independently of PSSCH transmit power.

Further details of this step are discussed below in the discussion of the first set of embodiments.

In case boosting of PSCCH transmit power is not allowed or feasible, certain embodiments instead modify or manipulate other transmission parameters of the PSCCH to achieve the same purpose as power boosting. Details of this step are discussed below in the discussion of the second set of embodiments. This step may be optional.

First Set of Embodiments: Transmit Power Control of Sidelink Control Channel

In sensing-based distributed resource selection of LTE/NR sidelink, a UE may exclude resources at least based on PSCCH decoding and certain additional conditions. Hence, correct PSCCH decoding is a key prerequisite of proper resource allocation. More specifically, similar communication ranges can be reached by PSCCH transmissions from different UEs. In this way, a UE can sense more accurately whether a channel is vacant or occupied. The following examples describe embodiments that achieve this goal by adjusting the transmit power of the control channel.

Set Tx Power of PSCCH Based on the Tx Power of PSSCH

According to certain embodiments, the Tx power of PSCCH is decided based on the determined Tx power of PSSCH. Note that in LTE V2X, there is a fixed 3 dB power boosting applied to PSCCH compared to PSSCH. Moreover, a UE may first derive the Tx power of PSSCH based on sidelink power control procedure, and then determine the Tx power of PSCCH according to the outcome of PSSCH power control. If the PSCCH requires higher transmit power either to maintain the desired PSCCH coverage or to ensure the target energy per bit (or per resource element), the PSCCH Tx power may be increased (boosted).

Consider that a UE applies a Pd dB power boosting to the Tx power of PSCCH, i.e., Pc, compared to the determined Tx power of PSSCH Ps. Hence, the Tx power of PSCCH is Pc=Ps+Pd.

Certain example embodiments discussed below use a flexible Pd value and describe various ways of determining Pd.

In some embodiments, the possible values of Ps, i.e., the determined Tx power of PSSCH, are divided into N+1 disjoint power intervals: [M0, M1], [M1, M2], . . . , [MN−1, MN], [MN, +infinity]. Typically, M0 may be set at 0. In this manner, the selection of Pd may be based on which interval the value of Ps belongs to.

Alternatively, in other embodiments, there is no division of the power values, i.e., there is only one power interval [0, +infinity].

For example, if Ps belongs to [MN, +infinity], then Pd is set to zero (i.e., there is no power boosting in this scenario). In this scenario, the Tx power of PSSCH being in this last/highest power bucket, the value of Ps may be determined so that it can already satisfy the needed transmission range of PSCCH, e.g., when the distance between Tx and Rx UEs is large.

As another example, if Ps belongs to [Mi, Mj] where $0 \leq i \leq j \leq N$, Pd may be determined as a value associated to the interval [Mi, Mj]. In particular, in some cases the value of Ps cannot satisfy the needed transmission range of PSCCH, e.g., when Tx UE is close to Rx UE. The Pd value may be associated with the corresponding power interval in various ways:

In some embodiments, each power interval [Mi, Mj] is (pre)configured with one power boosting value Pdj. Then, if Ps belongs to [Mi, Mj], it is set Pd=Pdj.

In particular embodiments, the value Pdj can further depend on modulation order, coding rate, target transmission range of PSCCH, etc.

In some embodiments, instead of one (pre)configured power boosting value Pdj, a (pre)configured range is provided for power boosting. In this case, the UE may select a proper power boosting value within the (pre)configured range.

In particular embodiments, the range may further depend on modulation order, coding rate, target transmission range of PSCCH, etc.

In the above embodiments, the power intervals: [M0, M1], [M1, M2], . . . , [MN−1, MN], [MN, +infinity], the power boosting candidates Pdj for 0≤j≤N, and the power boosting ranges may be configured by a network node or pre-configured.

In certain embodiments, the value of Pd is left up to UE implementation under the condition that Ps+(Ps+Pd)≤Pcmax, where Pcmax is the maximum power level that can be used. The value of Pcmax may be part of a specification, a configuration or pre-configuration. The value of Pcmax may also be the result of a formula, e.g., $$P_{cmax}=\min\{P_{max}, P'_{max}(PL_{UL})\}, \quad (4)$$

That is, the generic power control formula in (3) but disregarding the term P_(req) ($[\![ PL ]\!]$ _SL), which is related to the pathloss between TX UE and RX UE.

In certain embodiments, a maximum value for Pd may be defined instead of Pcmax. In some embodiments, a minimum value for Pd may also be defined.

According to certain embodiments, if Ps+(Ps+Pd)>Pcmax, it is set Ps+Pd=Pc=Pcmax−Ps. In this manner, the sum power of PSCCH and PSSCH may be adjusted to comply with the maximum allowed transmit power when the original determination of the sum exceeds the maximum allowed transmit power Pcmax.

In certain embodiments, the value of Pd varies over time. For example, at the beginning of the transmission of the control channel, Pd may be higher than at the end of the transmission. In this way, a transient period problem may be avoided at the end of the transmission of the control channel.

In one embodiment, the value of Pd may be set according to the formula in equation (4).

Figure 3:
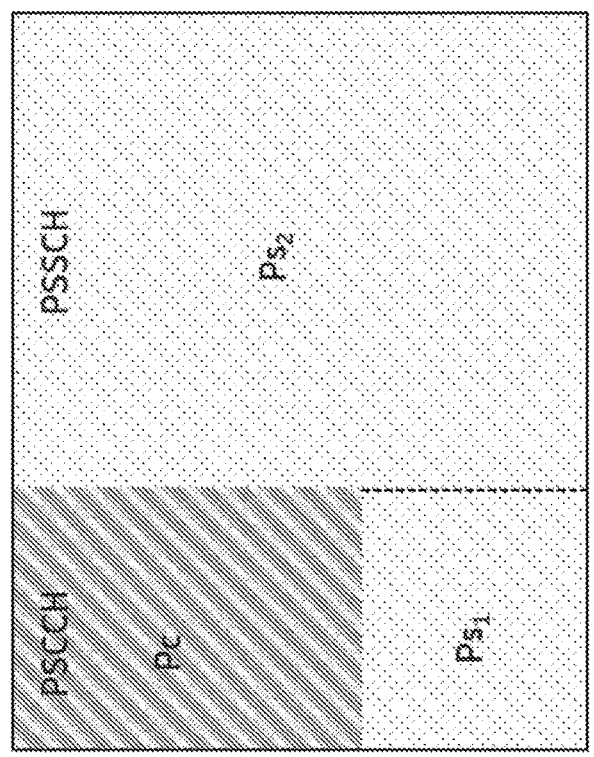
FIG. 3 illustrates an example of a power allocation, in accordance with certain embodiments.

In one embodiment, as shown in FIG. 3, the value of Ps for the OFDM symbols where both PSSCH and PSCCH are transmitted may be lower than the value used for the OFDM symbols where only PSSCH is transmitted. For example, The symbols shared between PSSCH and PSCCH may use Ps1 for PSSCH and Pc for PSCCH (including references symbols, etc. in both cases).

The symbols carrying PSSCH only, may use Ps2, where Ps1+Pc=Ps2.

Ps2 may be obtained from a power control formula (e.g., equation (3)). The split between Ps1 and Pc may be preconfigured or configured by a network node, or it may be left up to UE implementation.

Set Tx Power of PSCCH Independent of the Tx Power of PSSCH

In certain embodiments, the Tx power of PSCCH is decided based on its target transmission range without considering the determined Tx power of PSSCH. If all UEs' PSCCH transmissions can reach similar distance levels, it can facilitate more accurate sensing procedure of sidelink resource allocation.

As discussed below, various rules and methods may be used to determine the Tx power of PSCCH.

According to certain embodiments, there is a single target transmission power range for all UEs. Further, for each modulation and coding scheme (MCS) x, one (pre)configured Tx power value Pcx may be associated with that MCS x.

According to certain embodiments, instead of one (pre) configured Tx power value, there is one (pre)configured range for the Tx power of PSCCH. In this case, the UE may select proper PSCCH Tx power within the (pre)configured range.

In certain embodiments, there are multiple possible target transmission ranges. For each target transmission range and each MCS, one (pre)configured Tx power value may be specified.

Alternatively, in certain embodiments, instead on one (pre)configured Tx power value, there is one (pre)configured range for the Tx power of PSCCH. Accordingly, the UE may select proper PSCCH Tx power within the (pre)configured range.

In certain embodiments, a UE reduces the Tx power of PSCCH compared to the (pre)configured value. For example, if the sum power of PSCCH and PSSCH exceeds the maximum allowed transmit power Pcmax and the Tx power of PSSCH is determined by its own power control procedure, the UE may reduce the Tx power of the PSCCH to ensure the combined power does not exceed the maximum power allowed.

In certain embodiments, the determined transmit power of PSCCH affects the maximum allowed transmit power of PSSCH. Accordingly, the maximum allowed transmit power will be taken into account when performing power control of PSSCH. In some embodiments, the assigned PSCCH Tx power value or the assigned range of PSCCH Tx power can be configured by a network node or pre-configured.

Second Set of Embodiments: Other Transmission Parameters of Control Channel

As explained above, to achieve more accurate sensing-based resource allocation, similar transmission ranges are reached by PSCCH transmissions from different UEs. Accordingly, in certain embodiments, MCS and/or other transmission parameters of PSCCH may be adjusted in various ways.

In some cases, the allowed transmit power of PSCCH is limited by PSSCH transmit power determined by OLPC procedure. For example, OLPC determined transmit power could be a low value for a nearby unicast RX UE but the control information (PSCCH) is desired to be sensed by other UEs over a larger distance. To address the transient period issue, the sum power over different OFDM symbols in a slot should be constant. The power boosting of PSCCH is at the expense of the reduced power of PSSCH transmitted on the same OFDM symbols (e.g., Ps1<Ps2 as in FIG. 3 discussed above). Hence, the possible power boosting of PSCCH may also be limited. In these cases, if the allowed PSCCH Tx power cannot achieve its target transmission range, a UE can adjust its PSCCH MCS to improve on the range.

In certain embodiments, the possible values of PSCCH Tx power are divided into N+1 disjoint power intervals: [K0, K1], [K1, K2], . . . , [KN−1, KN], [KN, +infinity]. Further, the selection of the PSCCH MCS may depend on which interval the maximum allowed PSCCH Tx power belongs to.

Alternatively, in certain embodiments, each power interval [Ki, Kj] is (pre)configured with one MCS value MCSj. Then, if the maximum allowed PSCCH Tx power belongs to [Ki, Kj], it selects MCSj for the PSCCH transmission. In some embodiments, the MCSj can depend on the target transmission range of PSCCH.

In another alternative, in certain embodiments, instead on one (pre)configured MCS value MCSj, a (pre)configured range of MCS values may correspond to each power interval. In this case, the UE may select a proper MCS within the (pre)configured range. In some embodiments, the MCS range can depend on the target transmission range of PSCCH.

In this manner, other parameters of the control channel may be modified to enhance or increase the transmission of the control channel to augment power boosting or when power boosting is not possible or desirable.

Figure 7:
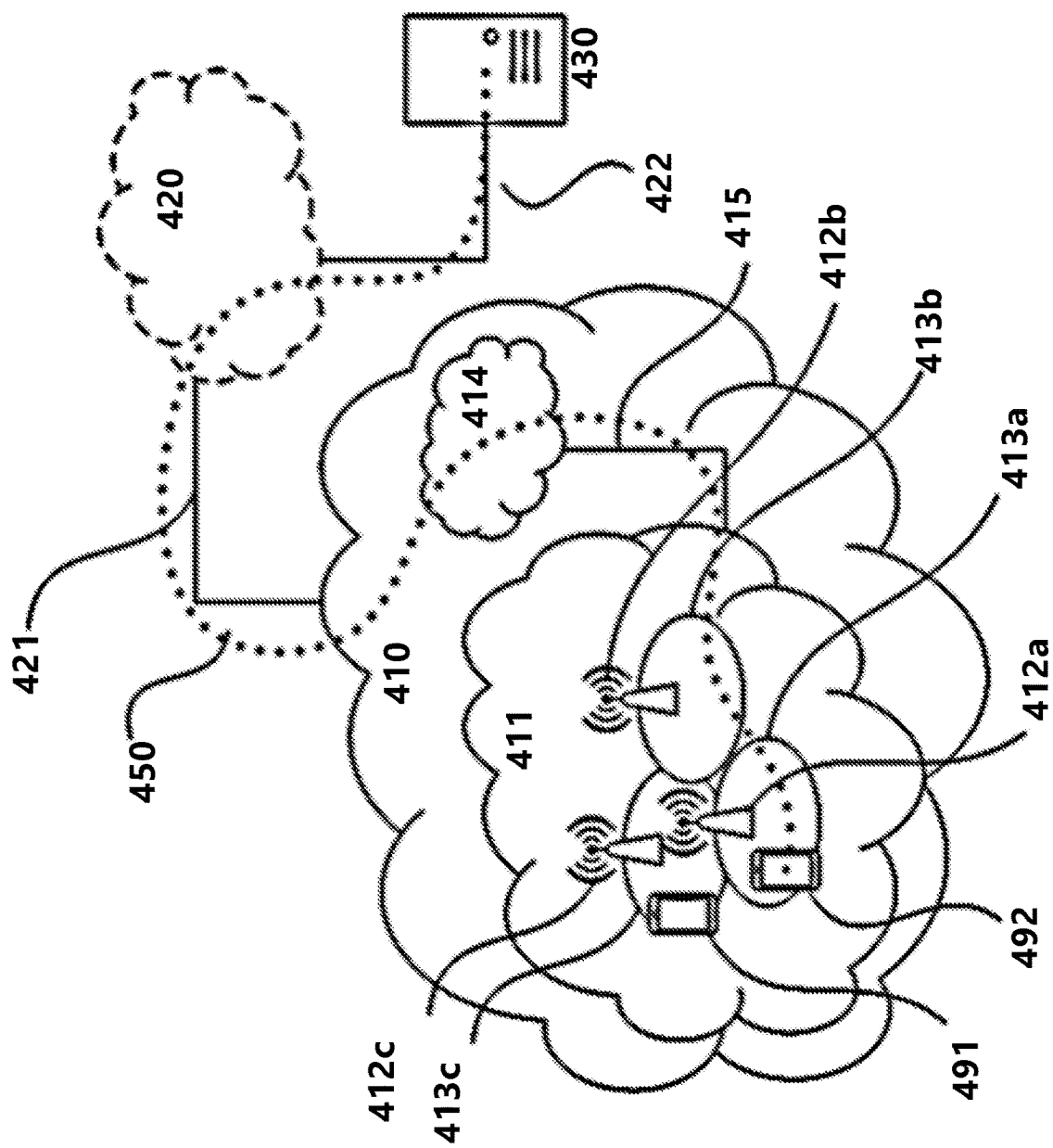
FIG. 7 illustrates an example telecommunication network connected via an intermediate network to a host computer, in accordance with certain embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M) nodes, Operation Support System (OSS) nodes, Self-Optimized Network (SON) nodes, positioning nodes (e.g., Enhanced-Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a Radio Network Controller (RNC) component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB (Evolved-Universal Terrestrial Radio Access Network (E-UTRAN) NodeB), or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 5:
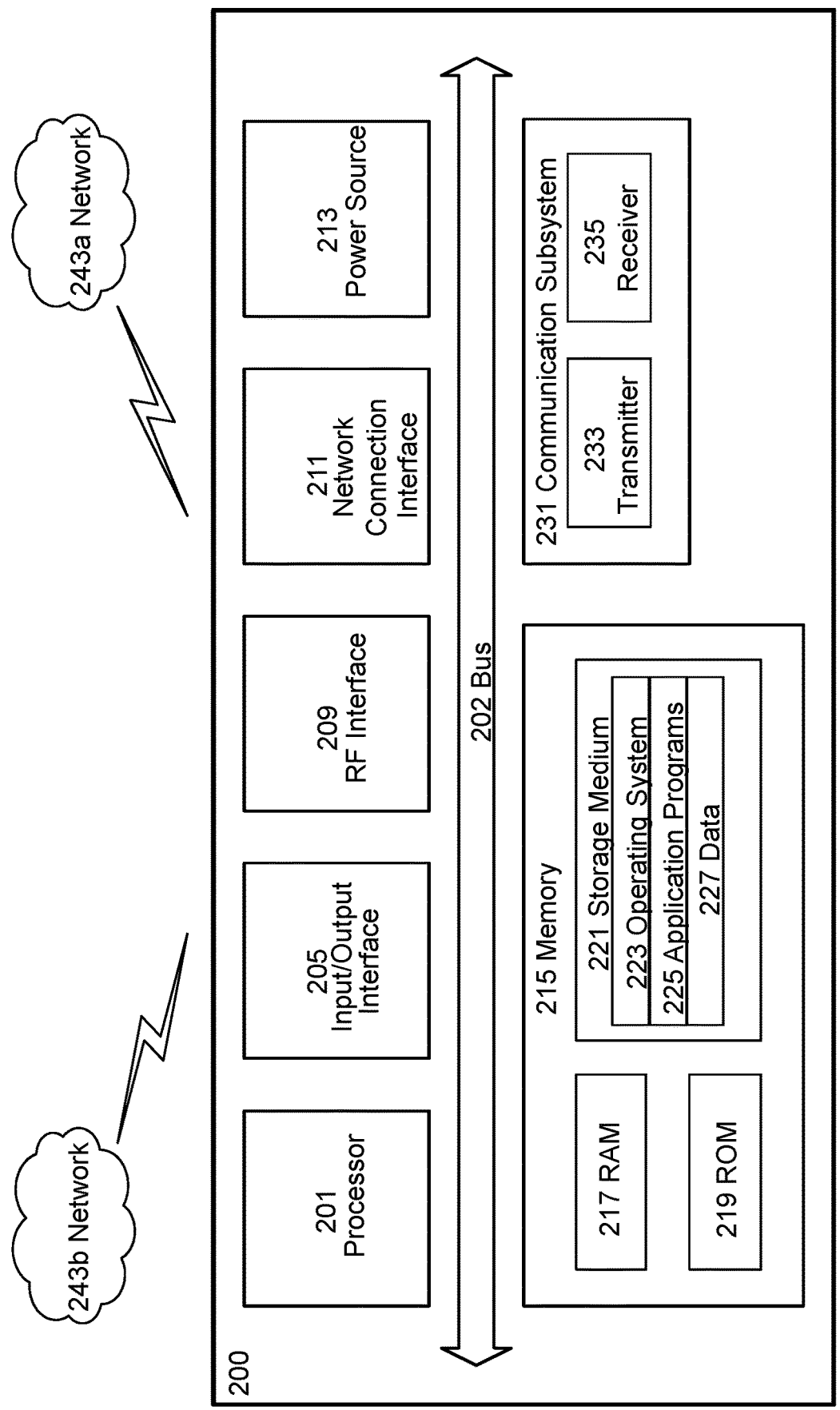
FIG. 5 illustrates an example user equipment, in accordance with certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, Universal Mobile Telecommunication System (UMTS), LTE, and/or 5G standards. As mentioned previously, the term WD and UE may be used interchangeably. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, Code Division Multiplexing Access (CDMA), Wide CDMA (WCDMA), Global System for Mobile communication (GSM), LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
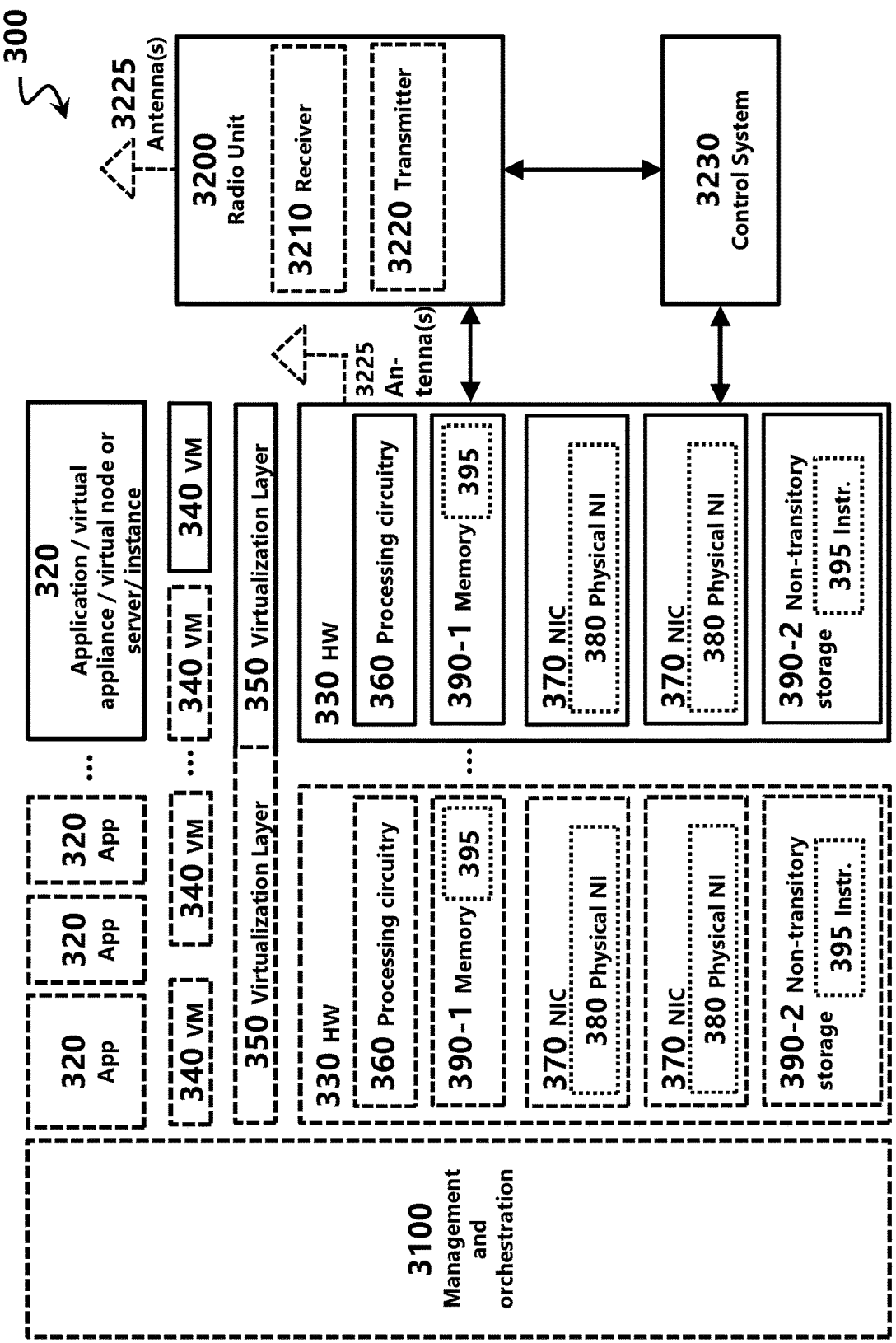
FIG. 6 illustrates an example virtualization environment, in accordance with certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538.

Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 8:
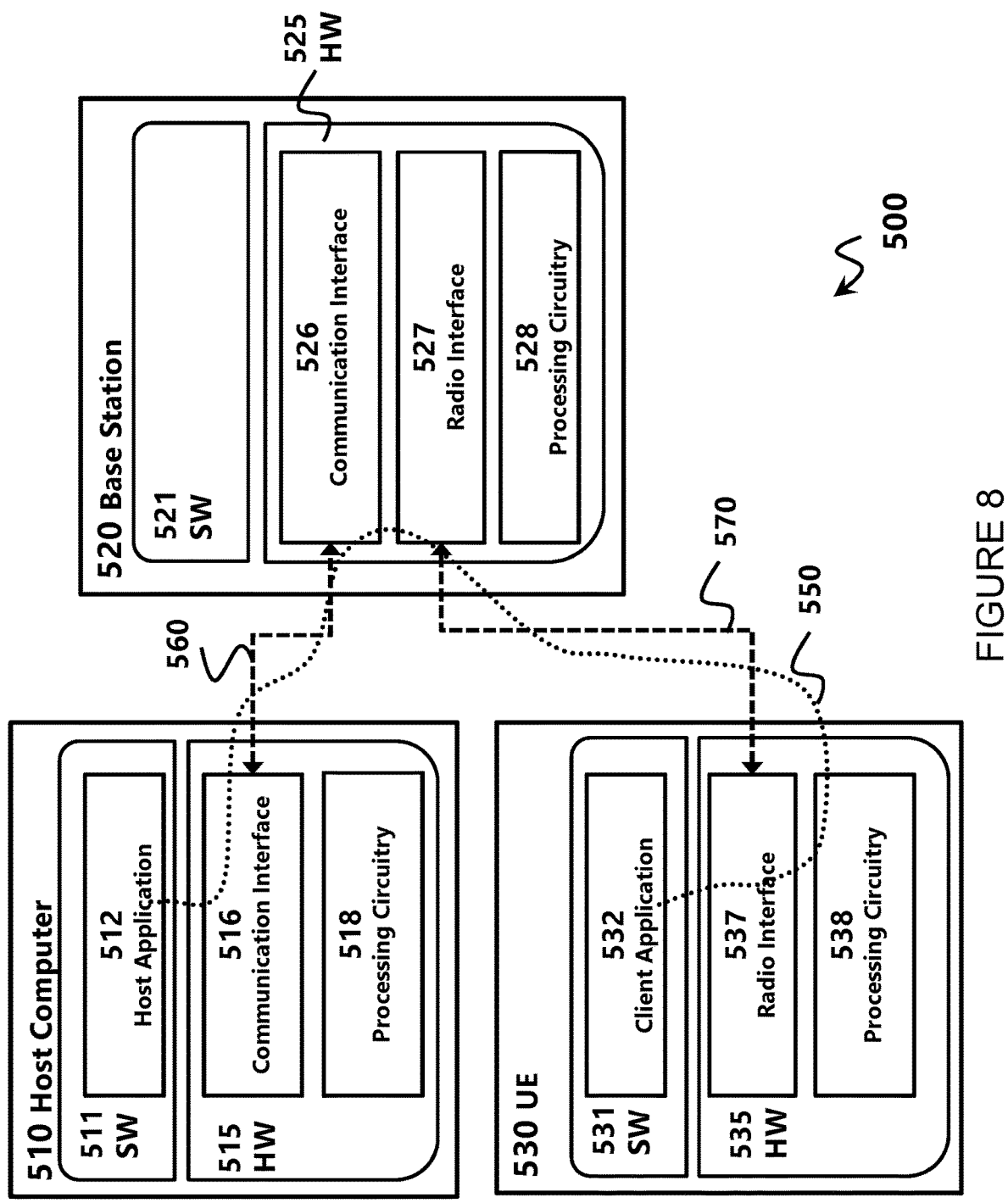
FIG. 8 illustrates an example host computer communicating via a base station with a user equipment over a partially wireless connection, in accordance with certain embodiments.

It is noted that host computer 510, base station 520 and UE 530 illustrated in FIG. 8 may be similar or identical to host computer 430, one of base stations 412a, 412b, 412c and one of UEs 491, 492 of FIG. 7, respectively. This is to say, the inner workings of these entities may be as shown in FIG. 5 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the power consumption, data rate, and latency and thereby provide benefits such as extended battery lifetime, reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 4:
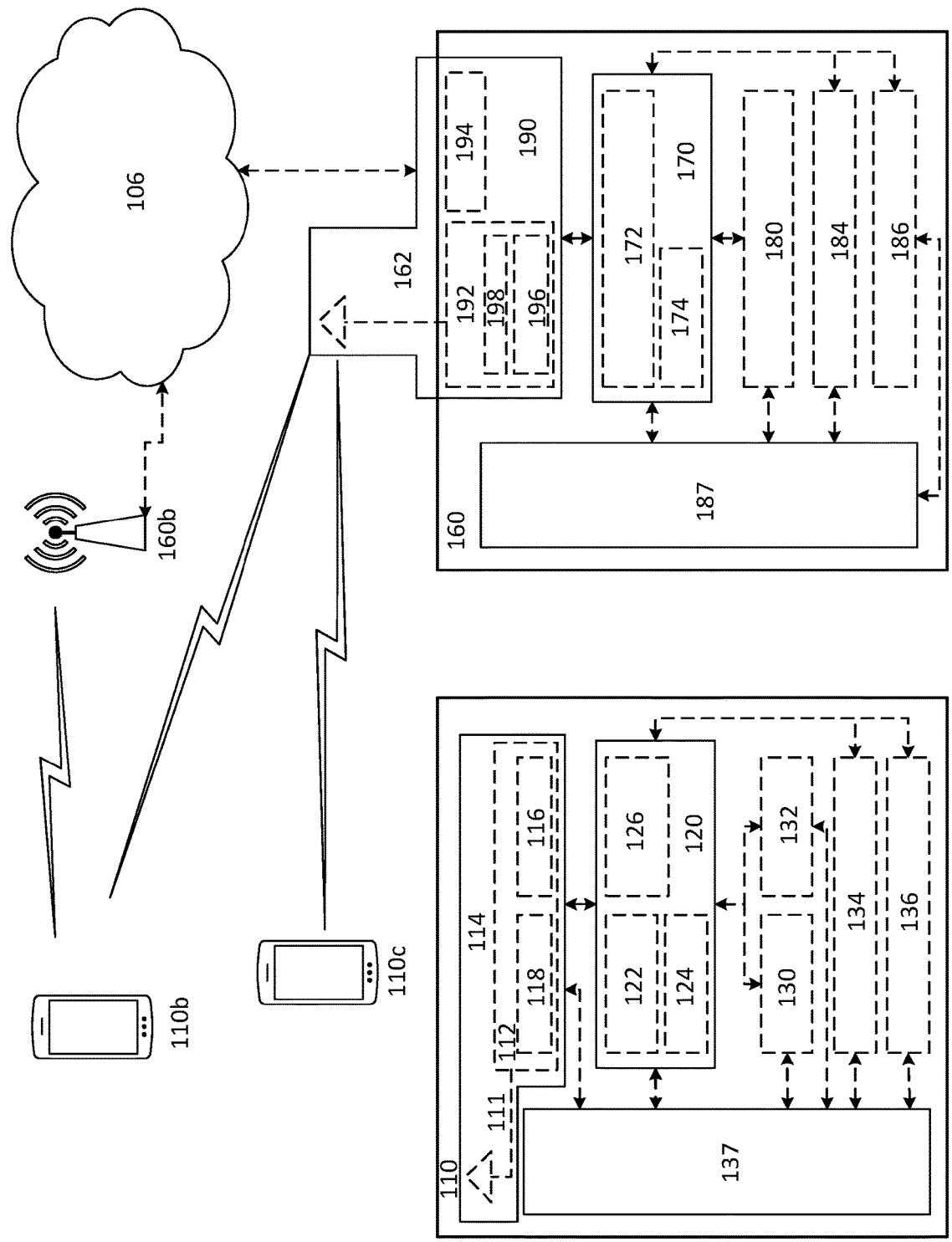
FIG. 4 illustrates an example wireless network, in accordance with certain embodiments.
Figure 9:
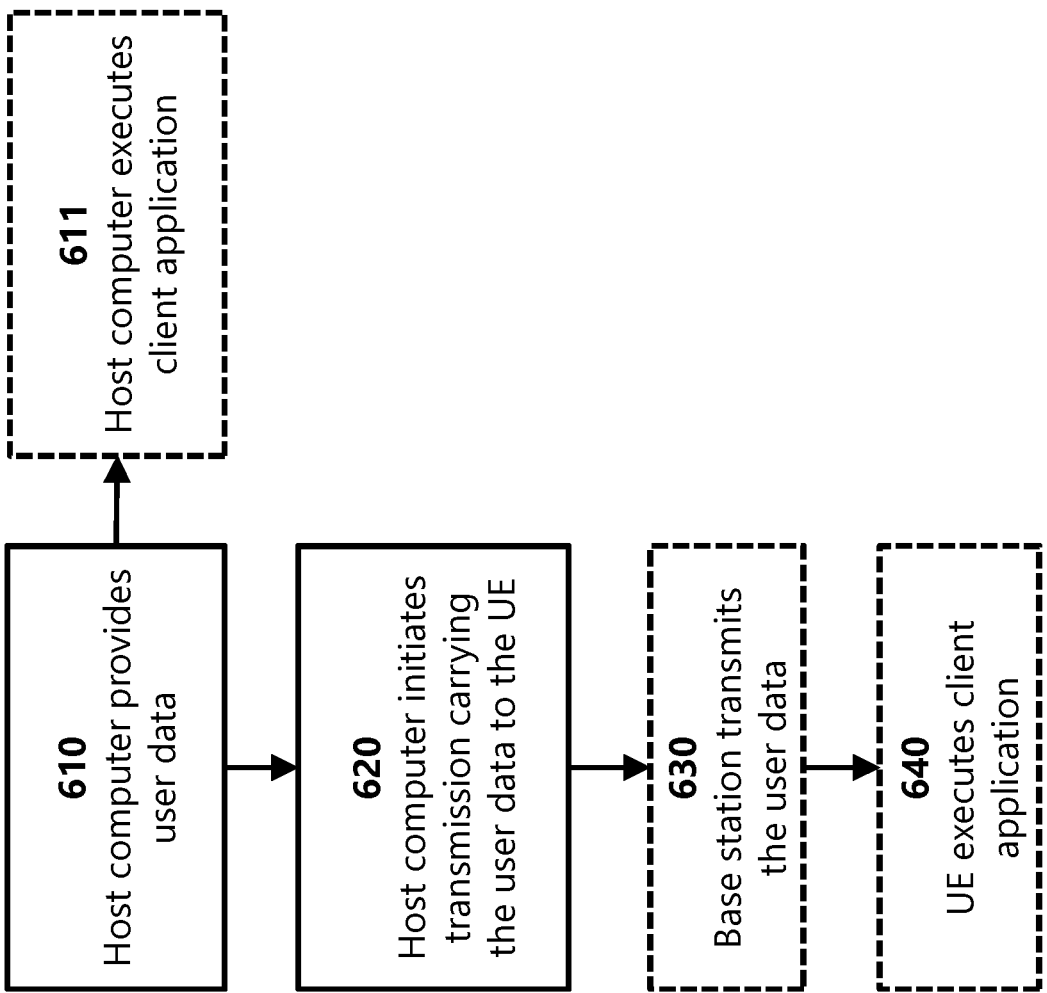
FIG. 9 is a flowchart illustrating an example method implemented in a communication system, in accordance certain embodiments.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
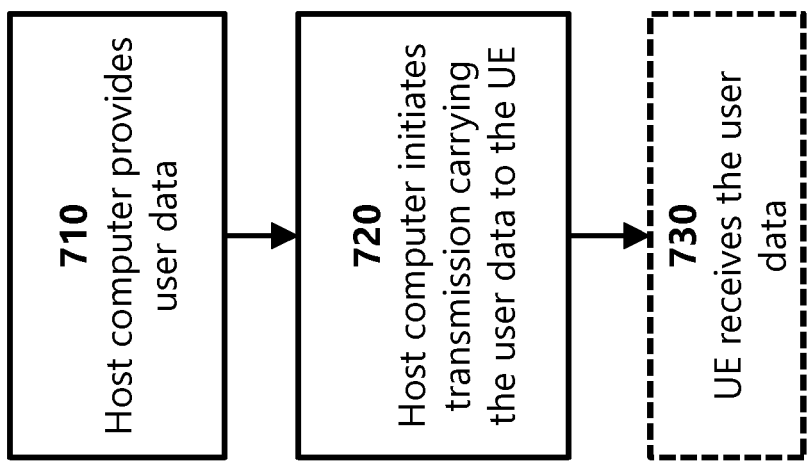
FIG. 10 is a flowchart illustrating a second example method implemented in a communication system, in accordance with certain embodiments.

FIG. 10 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
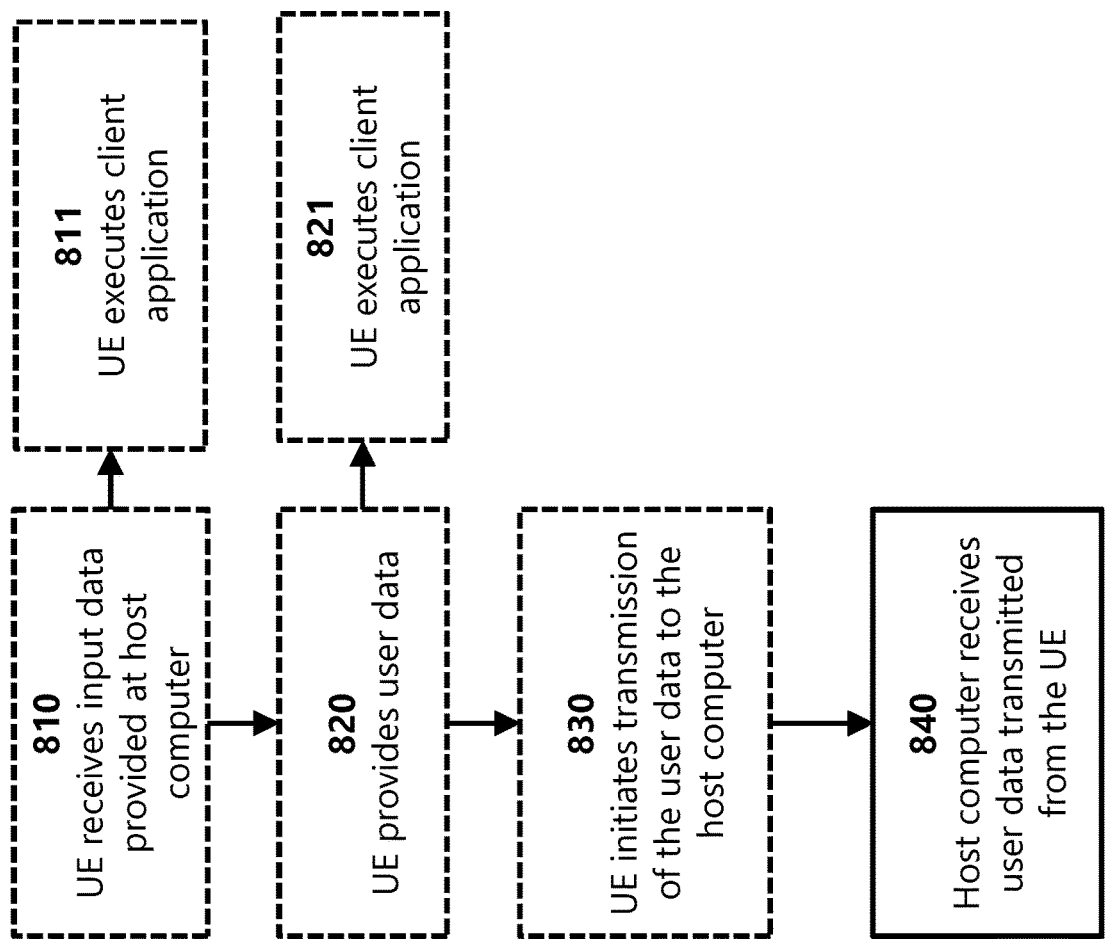
FIG. 11 is a flowchart illustrating a third method implemented in a communication system, in accordance with certain embodiments.

FIG. 11 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
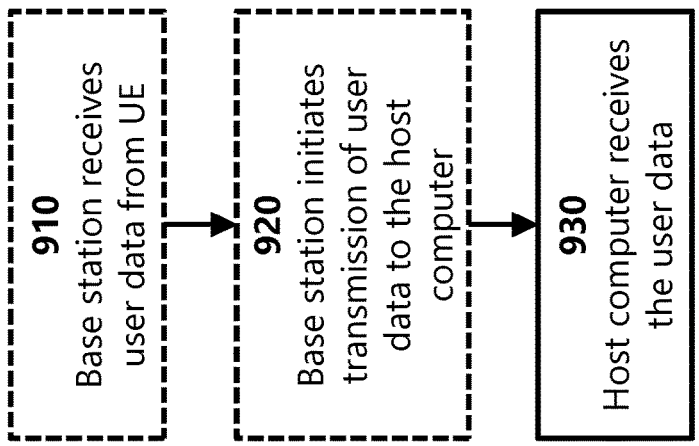
FIG. 12 is a flowchart illustrating a fourth method implemented in a communication system, in accordance with certain embodiments.

FIG. 12 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

EMBODIMENTS

The following list provides examples of methods performed by a wireless device (Group A), methods performed by a network node (Group B), and other embodiments (Group C) of the present disclosure.

Group A Embodiments

1. A method performed by a wireless device, the method comprising:
   determining a data channel transmit power level for transmitting a sidelink wireless data channel to the receiving wireless device;
   determining a control channel transmit power level for transmitting a sidelink wireless control channel, wherein the control channel transmit power level is based on the data channel transmit power; and
   transmitting on the sidelink wireless data channel at the data channel transmit power level and on the sidelink wireless control channel at the control channel transmit power level.

2. The method of the previous embodiment, wherein the control channel transmit power level is the summation of the data channel transmit power level and a boost value.

3. The method of any of the previous embodiments, wherein:
   a. possible values for the data channel transmit power level are divided into disjointed power intervals; and
   b. the control channel transmit power level is based on which of the disjoint power intervals the data channel transmit power level falls into.

4. The method of the previous embodiment, wherein:
   a. each disjointed power interval corresponds to a single boost value; and
   b. determining the control channel transmit power level comprises adding a boost value corresponding to a power interval into which the data transmit power level falls to the data channel transmit power to obtain the control channel transmit power.
5. The method of any of embodiments 2-3, wherein
   a. each disjointed power interval corresponds to a range of boost values; and
   b. determining the control channel transmit power level comprises:
      i. determining a boost value in the range of boost values corresponding to a power interval into which the data transmit power level falls to apply to the control channel transmit power; and
      ii. adding the determined boost value to the data channel transmit power to obtain the control channel transmit power.
6. The method of any of embodiments 2-6, wherein the boost value is based on one or more of a modulation order, a coding rate, or a target transmission range of the sidelink wireless control channel.
7. The method of any of the previous embodiments, wherein the determined control channel transmit power is equal to the data channel transmit power if the data channel transmit power exceeds a predetermined threshold value.
8. The method of any of embodiments 3-8, wherein the disjointed power intervals are configured by a network node communicating with the wireless device.
9. The method of any of embodiments 3-8, wherein the disjointed power intervals are preconfigured.
10. The method of any of the previous embodiments, wherein the determined data channel transmit power varies based on whether the data channel is multiplexed with the control channel.
11. The method of any of the previous embodiments, wherein:
   a. the summation of the determined data channel transmit power and the control channel transmit power exceeds a maximum transmit power; and
   b. the method further comprises reducing the data channel transmit power such that it is equal to or less than the difference between the maximum transmit power and the control channel transmit power.
12. A method performed by a wireless device, the method comprising:
   determining a data channel transmit power level for transmitting a sidelink wireless data channel to the receiving wireless device;
   determining a control channel transmit power level for transmitting a sidelink wireless control channel, wherein the control channel transmit power level is determined independently from the determination of the data channel transmit power; and
   transmitting on sidelink wireless data channel at the data channel transmit power level and on the sidelink wireless control channel at the control channel transmit power level.
13. The method of the previous embodiment, wherein:
   a. each modulation and coding scheme (MCS) usable by the wireless device is associated with a transmission power value; and
   b. the method further comprises:
      i. determining the MCS for transmitting to the receiving wireless device; and
      ii. based on the determined MCS, selecting the associated transmission power value as the control channel transmit power.
14. The method of embodiment 12, wherein:
   a. each modulation and coding scheme (MCS) usable by the wireless device is associated with a range of transmission power values; and
   b. the method further comprises:
      i. determining the MCS for transmitting to the receiving wireless device; and
      ii. based on the determined MCS, selecting a power value from the associated range of transmission power values as the control channel transmit power.
15. The method of any of embodiments 12-14, further comprising:
   a. determining a target transmission range for the wireless device; and
   b. determining the control channel transmit power based at least on the target transmission range and the determined MCS.
16. The method of any of embodiments 13-15, wherein the association of MSC with a transmission power value or range of transmission power values is configured by a network node communicating with the wireless device.
17. The method of any of embodiments 13-15, wherein the association of MSC with a transmission power value or range of transmission power values is preconfigured
18. The method of any of the previous embodiments, wherein:
   a. the summation of the determined data channel transmit power and the control channel transmit power exceeds a maximum transmit power; and
   b. the method further comprises setting the control channel transmit power to equal the difference between the maximum transmit power and the data channel transmit power.
19. The method of the previous embodiment, wherein:
   a. the maximum transmit power varies over the duration of the transmission by the wireless device; and
   b. the method further comprises adjusting the control channel transmit power as the maximum transmit power changes.
20. The method of any of the previous embodiments, further comprising adjusting the MCS of the control channel based on the control channel transmit power.
21. The method of the previous embodiment, wherein:
   a. possible values of the control channel transmit power are divided into are divided into disjointed power intervals; and
   b. adjusting the MCS is based on which of the disjoint power intervals the control channel transmit power level falls into.
22. The method of any of the previous embodiments, further comprising:
   providing user data; and
   forwarding the user data to a host computer via the transmission to the base station.

Group B Embodiments

23. A method performed by a base station, the method comprising:
   configuring a wireless device with one or more power control parameters, wherein the wireless device uses the one or more power control parameters to determine a data channel transmit power and a control channel transmit power for transmitting in a wireless sidelink to a receiving wireless device.
24. The method of the previous embodiment, wherein the one or more control parameters are used by the wireless device to determine a fractional path loss compensation.
25. The method of embodiments 23-24, further comprising setting a target energy per bit or target energy per resource element for the control channel used by the wireless device for the wireless sidelink to the receiving wireless device.
26. The method of the previous embodiment, wherein the target energy per bit or target energy per resource element is independent from the fraction path loss compensation.
27. The method of any of the previous embodiments, further comprising:
obtaining user data; and
forwarding the user data to a host computer or a wireless device.

Group C Embodiments

28. A wireless device, the wireless device comprising:
processing circuitry configured to perform any of the steps of any of the Group A embodiments; and
power supply circuitry configured to supply power to the wireless device.
29. A base station, the base station comprising:
processing circuitry configured to perform any of the steps of any of the Group B embodiments;
power supply circuitry configured to supply power to the base station.
30. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
31. A computer program, the computer program comprising instructions which when executed on a computer perform any of the steps of any of the Group A embodiments.
32. A computer program product comprising a computer program, the computer program comprising instructions which when executed on a computer perform any of the steps of any of the Group A embodiments.
33. A non-transitory computer-readable storage medium or carrier comprising a computer program, the computer program comprising instructions which when executed on a computer perform any of the steps of any of the Group A embodiments.
34. A computer program, the computer program comprising instructions which when executed on a computer perform any of the steps of any of the Group B embodiments.
35. A computer program product comprising a computer program, the computer program comprising instructions which when executed on a computer perform any of the steps of any of the Group B embodiments.
36. A non-transitory computer-readable storage medium or carrier comprising a computer program, the computer program comprising instructions which when executed on a computer perform any of the steps of any of the Group B embodiments.
37. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
38. The communication system of the pervious embodiment further including the base station.
39. The communication system of the previous 2 embodiments, further including the UE, wherein the UE is configured to communicate with the base station.
40. The communication system of the previous 3 embodiments, wherein:
the processing circuitry of the host computer is configured to execute a host application, thereby providing the user data; and
the UE comprises processing circuitry configured to execute a client application associated with the host application.
41. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
42. The method of the previous embodiment, further comprising, at the base station, transmitting the user data.
43. The method of the previous 2 embodiments, wherein the user data is provided at the host computer by executing a host application, the method further comprising, at the UE, executing a client application associated with the host application.
44. A user equipment (UE) configured to communicate with a base station, the UE comprising a radio interface and processing circuitry configured to performs the of the previous 3 embodiments.
45. A communication system including a host computer comprising:
processing circuitry configured to provide user data; and
a communication interface configured to forward user data to a cellular network for transmission to a user equipment (UE), wherein the UE comprises a radio interface and processing circuitry, the UE's components configured to perform any of the steps of any of the Group A embodiments.

46. The communication system of the previous embodiment, wherein the cellular network further includes a base station configured to communicate with the UE.

47. The communication system of the previous 2 embodiments, wherein:
   the processing circuitry of the host computer is configured to execute a host application, thereby providing the user data; and
   the UE's processing circuitry is configured to execute a client application associated with the host application.

48. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

49. The method of the previous embodiment, further comprising at the UE, receiving the user data from the base station.

50. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

51. The communication system of the previous embodiment, further including the UE.

52. The communication system of the previous 2 embodiments, further including the base station, wherein the base station comprises a radio interface configured to communicate with the UE and a communication interface configured to forward to the host computer the user data carried by a transmission from the UE to the base station.

53. The communication system of the previous 3 embodiments, wherein:
   the processing circuitry of the host computer is configured to execute a host application; and
   the UE's processing circuitry is configured to execute a client application associated with the host application, thereby providing the user data.

54. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

55. A method implemented in a communication system including a host computer, a base station and a user equipment (UE), the method comprising:
   at the host computer, receiving user data transmitted to the base station from the UE, wherein the UE performs any of the steps of any of the Group A embodiments.

56. The method of the previous embodiment, further comprising, at the UE, providing the user data to the base station.

57. The method of the previous 2 embodiments, further comprising:
   at the UE, executing a client application, thereby providing the user data to be transmitted; and
   at the host computer, executing a host application associated with the client application.

58. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

59. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

60. The communication system of the previous embodiment further including the base station.

61. The communication system of the previous 2 embodiments, further including the UE, wherein the UE is configured to communicate with the base station.

62. The communication system of the previous 3 embodiments, wherein:
   the processing circuitry of the host computer is configured to execute a host application;
   the UE is configured to execute a client application associated with the host application, thereby providing the user data to be received by the host computer.

63. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

64. The method of the previous embodiment, further comprising at the base station, receiving the user data from the UE.

65. The method of the previous 2 embodiments, further comprising at the base station, initiating a transmission of the received user data to the host computer.

Figure 13:
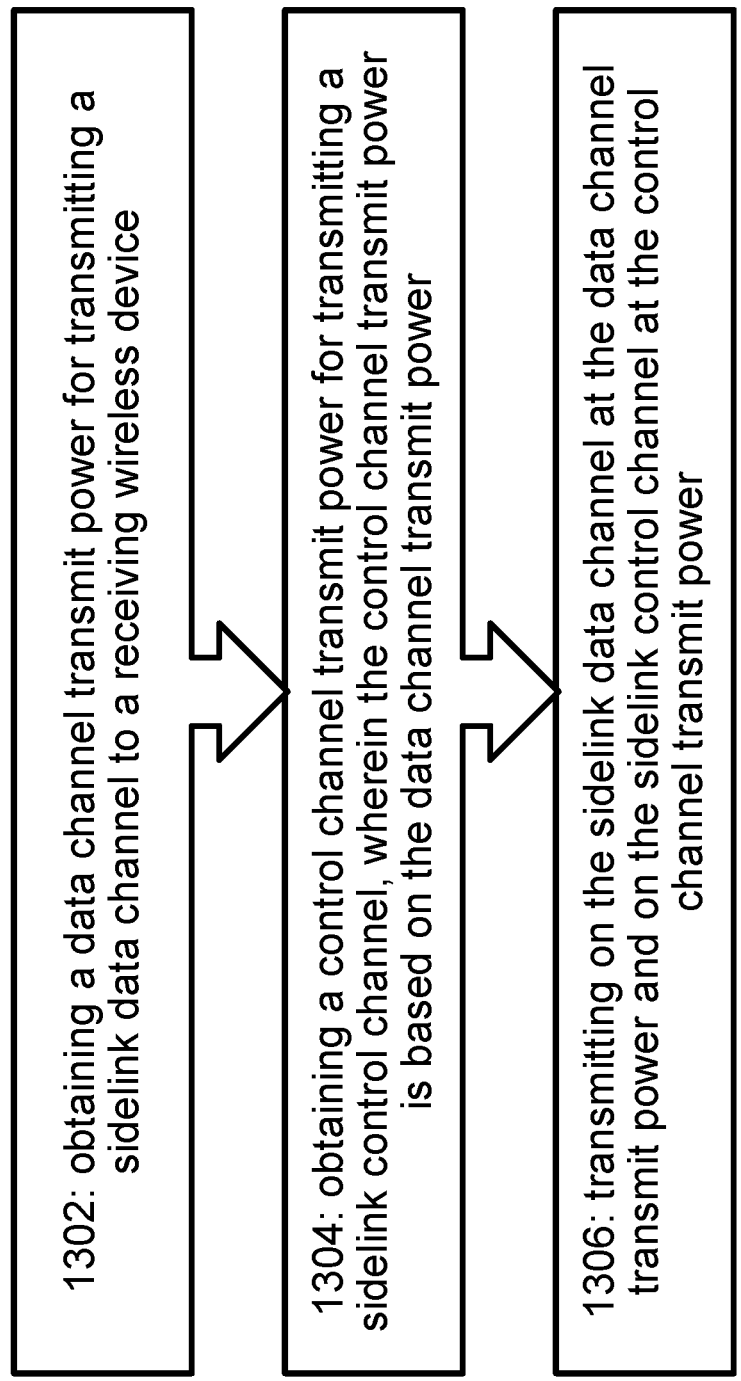
FIG. 13 is a flowchart illustrating a method performed by a wireless device that transmits on a sidelink channel, in accordance with certain embodiments.
Figure 14:
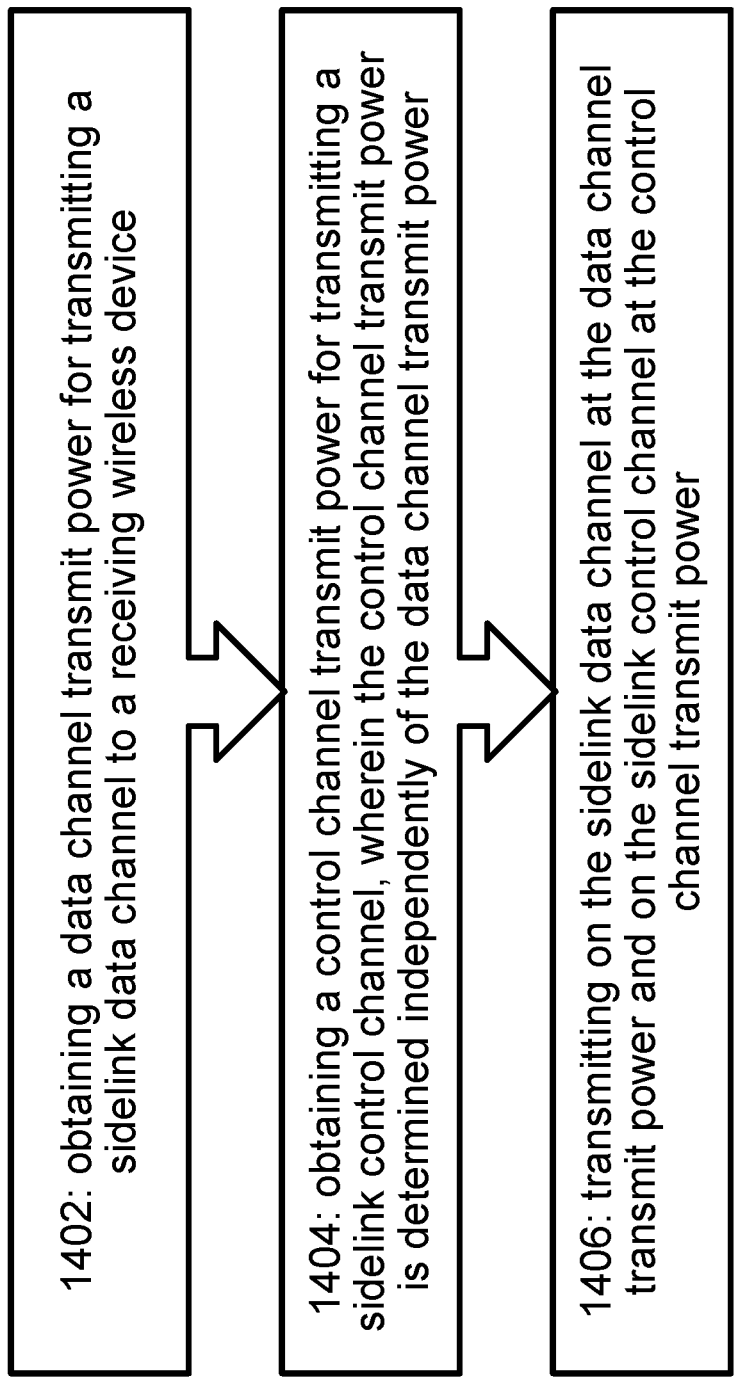
FIG. 14 is a flowchart illustrating a method performed by a wireless device that transmits on a sidelink channel, in accordance with certain embodiments.

FIGS. 13 and 14 each illustrate an example of a method performed by a wireless device, such as wireless device 110, in accordance with certain embodiments. As an example, wireless device 110 may use processing circuitry 120 to carry out any of the methods. In some embodiments, the wireless device may be a UE, such as UE 200. The methods may allow the wireless device to control its transmit power for sidelink communications while reducing transients, satisfying target values for SNR, SINR, or other parameters, and/or accounting for varying transmission requirements such as the number of target UE receivers, transmission range, etc. that vary with unicast/groupcast sessions.

The method of FIG. 13 begins at step 1302 with obtaining a data channel transmit power for transmitting on a sidelink data channel (e.g., PSSCH) to a receiving wireless device. In some embodiments, the data channel transmit power is obtained by determining the data channel transmit power at the wireless device. As an example, the wireless device may determine the data channel transmit power based on power control parameters, information related to radio conditions (such as SNR, SINR, path loss), and/or other suitable information. In some embodiments, the wireless device may perform a calculation to determine the data channel transmit power. For example, a wireless device may use a fractional path loss compensation technique to compute the data channel transmit power, e.g., using equation (1) discussed above.

In other embodiments, the data channel transmit power is obtained by receiving signalling from a network node that indicates the data channel transmit power. As an example, in Network-based Mode 1 (Mode 3 in LTE V2X), the network may select the transmit parameters assigned to the wireless device for the sidelink.

The method proceeds to step 1304 with obtaining a control channel transmit power for transmitting on a sidelink control channel (e.g., PSCCH). In some embodiments, the control channel transmit power is obtained by determining the control channel transmit power at the wireless device. For example, the wireless device may perform a calculation to determine the control channel transmit power. In other embodiments, the control channel transmit power is obtained by receiving signalling from a network node that indicates the control channel transmit power. As an example, in Network-based Mode 1 (Mode 3 in LTE V2X), the network may select the transmit parameters assigned to the wireless device for the sidelink.

In the embodiment of FIG. 13, the control channel transmit power is based on the data channel transmit power. The following paragraphs provide various examples of how the control channel transmit power may be determined based on the data channel transmit power.

In some embodiments, the control channel transmit power is determined based on adding a boost value to the data channel transmit power. In some embodiments, the boost value depends on a calculation (e.g., instead of merely applying a uniform 3 dB boost to the data channel transmit power to obtain the control channel transmit power). In some embodiments, the calculation may determine the boost value based on one or more of the following: an estimated path loss between the wireless device and the receiving wireless device, a modulation order, a coding rate, and/or a target transmission range of the sidelink control channel.

In some embodiments, the control channel transmit power is determined based on a power interval into which the data channel transmit power falls. For example, possible values for the data channel transmit power are divided into power intervals. The power intervals can be preconfigured (e.g., according to a standards specification or an implementation of the wireless device), or the power intervals can be configured by a network node communicating with the wireless device. Each of the power intervals corresponds to a respective boost value (or range of boost values). The control channel transmit power is determined based on adding the data channel transmit power obtained in step 1302 and the boost value that corresponds to the power interval into which the data channel transmit power falls (or, for cases using a range of boost values, one of the boost values selected from the range of boost values that corresponds to the power interval into which the data channel transmit power falls). Examples of power intervals are further described above under the heading First set of embodiments: transmit power control of sidelink control channel (discussing power intervals [M0, M1], [M1, M2], . . . , [MN−1, MN], [MN, +infinity]).

In some embodiments, when the data channel transmit power exceeds a predetermined threshold value, the control channel transmit power is equal to the data channel transmit power.

In some embodiments, the data channel transmit power varies based on whether the sidelink data channel is multiplexed with the sidelink control channel.

In some embodiments, the data channel transmit power is reduced when a sum of the data channel transmit power and the control channel transmit power exceeds a maximum transmit power. As an example, the data channel transmit power is reduced such that it is equal to or less than the difference between the maximum transmit power and the control channel transmit power. In some embodiments, the maximum transmit power varies over the duration of the transmission by the wireless device, and the control channel transmit power is adjusted as the maximum transmit power changes. Controlling the data channel transmit power and/or the control channel transmit power based on the maximum transmit power may help to avoid a large transient over the duration of the transmission.

The method proceeds to step 1306 with transmitting one or more transmissions on the sidelink data channel and one or more transmissions on the sidelink control channel. Optionally, transmissions on the sidelink data channel may be multiplexed with transmissions on the sidelink control channel. The transmissions on the sidelink data channel are transmitted at the data channel transmit power obtained at step 1302, and the transmissions on the sidelink control channel are transmitted at the control channel transmit power obtained at strep 1304. As discussed in step 1304, the control channel transmit power is based on the data channel transmit power.

In some embodiments, a first group of one or more symbols is used to transmit on both the sidelink data channel (at the data channel transmit power) and the sidelink control channel (at the control channel transmit power). A second group of one or more symbols is used to transmit on only the sidelink data channel at a second data channel transmit power determined by adding the data channel transmit power and the control channel transmit power. In some embodiments, the second group of one or more symbols are adjacent symbols within a same slot or subframe. FIG. 3 illustrates an example of the first group of symbols (Pc transmits on the sidelink control channel (PSCCH) and Ps1 transmits on the sidelink data channel (PSSCH)) and the second group of symbols (Ps2 transmits on the sidelink data channel (PSSCH)). In the example, Ps2 may be set to the sum of PC and Ps1 in order to reduce transients when the PSSCH and PSCCH from the first and second groups of symbols are within the same slot or subframe.

For further explanation of embodiments that determine the control channel transmit power based on the data channel transmit power, see the above description under the heading First set of embodiments: transmit power control of sidelink control channel (subheading: Set Tx power of PSCCH based on the Tx power of PSSCH).

The method of FIG. 14 begins at step 1402 with obtaining a data channel transmit power for transmitting on a sidelink data channel to a receiving wireless device. In some embodiments, the data channel transmit power is obtained by determining the data channel transmit power at the wireless device. As an example, the wireless device may determine the data channel transmit power based on power control parameters, information related to radio conditions (such as SNR, SINR, path loss), and/or other suitable information. In some embodiments, the wireless device may perform a calculation to determine the data channel transmit power. For example, a wireless device may use a fractional path loss compensation technique to compute the data channel transmit power, e.g., using equation (1) discussed above.

In other embodiments, the data channel transmit power is obtained by receiving signalling from a network node that indicates the data channel transmit power. As an example, in Network-based Mode 1 (Mode 3 in LTE V2X), the network may select the transmit parameters assigned to the wireless device for the sidelink.

The method proceeds to step 1404 with obtaining a control channel transmit power for transmitting on a sidelink control channel. In some embodiments, the control channel transmit power is obtained by determining the control channel transmit power at the wireless device. For example, the wireless device may perform a calculation to determine the control channel transmit power. In other embodiments, the control channel transmit power is obtained by receiving signalling from a network node that indicates the control channel transmit power. As an example, in Network-based Mode 1 (Mode 3 in LTE V2X), the network may select the transmit parameters assigned to the wireless device for the sidelink.

In the embodiment of FIG. 14, the control channel transmit power is determined independently of the data channel transmit power. The following paragraphs provide various examples of how the control channel transmit power may be determined independently of the data channel transmit power.

In some embodiments, the control channel transmit power depends at least in part on the MCS to be used for transmitting from the wireless device to the receiving wireless device (e.g., the MCS to be used for transmitting on the sidelink control channel and/or sidelink data channel). For example, each MCS candidate that is usable by the wireless device is associated with a respective transmission power value (or range of transmission power values). The association between each MCS candidate and its respective transmission power value or range of transmission power values can be preconfigured (e.g., according to a standards specification or an implementation of the wireless device) or can be communicated to the wireless device from a network node. Once an MCS is selected from among the MCS candidates (i.e., the MCS that is selected to actually be used for transmitting from the wireless device), the transmission power value associated with the selected MCS may be selected as the control channel transmit power. In the case where the selected MCS is associated with a range of transmission power values, one of the transmission power values within the range may be selected as the control channel transmit power.

In some embodiments, the control channel transmit power is determined based on at least a target transmission range for the wireless device and an MCS for transmitting to the receiving wireless device.

In some embodiments, when a sum of the data channel transmit power and the control channel transmit power exceeds a maximum transmit power, the data channel transmit power is reduced such that it is equal to or less than the difference between the maximum transmit power and the control channel transmit power. In some embodiments, the maximum transmit power varies over the duration of the transmission by the wireless device and the control channel transmit power is adjusted as the maximum transmit power changes. Controlling the data channel transmit power and/or the control channel transmit power based on the maximum transmit power may help to avoid a large transient over the duration of the transmission.

In some embodiments the MCS of the sidelink control channel is adjusted based on the control channel transmit power. Certain embodiments may determine the MCS of the sidelink control channel based on a power interval that the control channel transmit power falls into (such as one of power intervals [K0, K1], [K1, K2], . . . , [KN−1, KN], [KN, +infinity] described above under the heading Second set of embodiments: other transmission parameters of control channel).

The method proceeds to step 1406 with transmitting one or more transmissions on the sidelink data channel and one or more transmissions on the sidelink control channel. Optionally, transmissions on the sidelink data channel may be multiplexed with transmissions on the sidelink control channel. The transmissions on the sidelink data channel are transmitted at the data channel transmit power obtained in step 1402, and the transmissions on the sidelink control channel are transmitted at the control channel transmit power obtained at step 1404. As discussed in step 1404, the control channel transmit power is determined independently of the data channel transmit power.

For further explanation of embodiments that determine the control channel transmit power independently of the data channel transmit power, see the above description under the heading First set of embodiments: transmit power control of sidelink control channel (subheading: Set Tx power of PSCCH independent of the Tx power of PSSCH).

Figure 16:
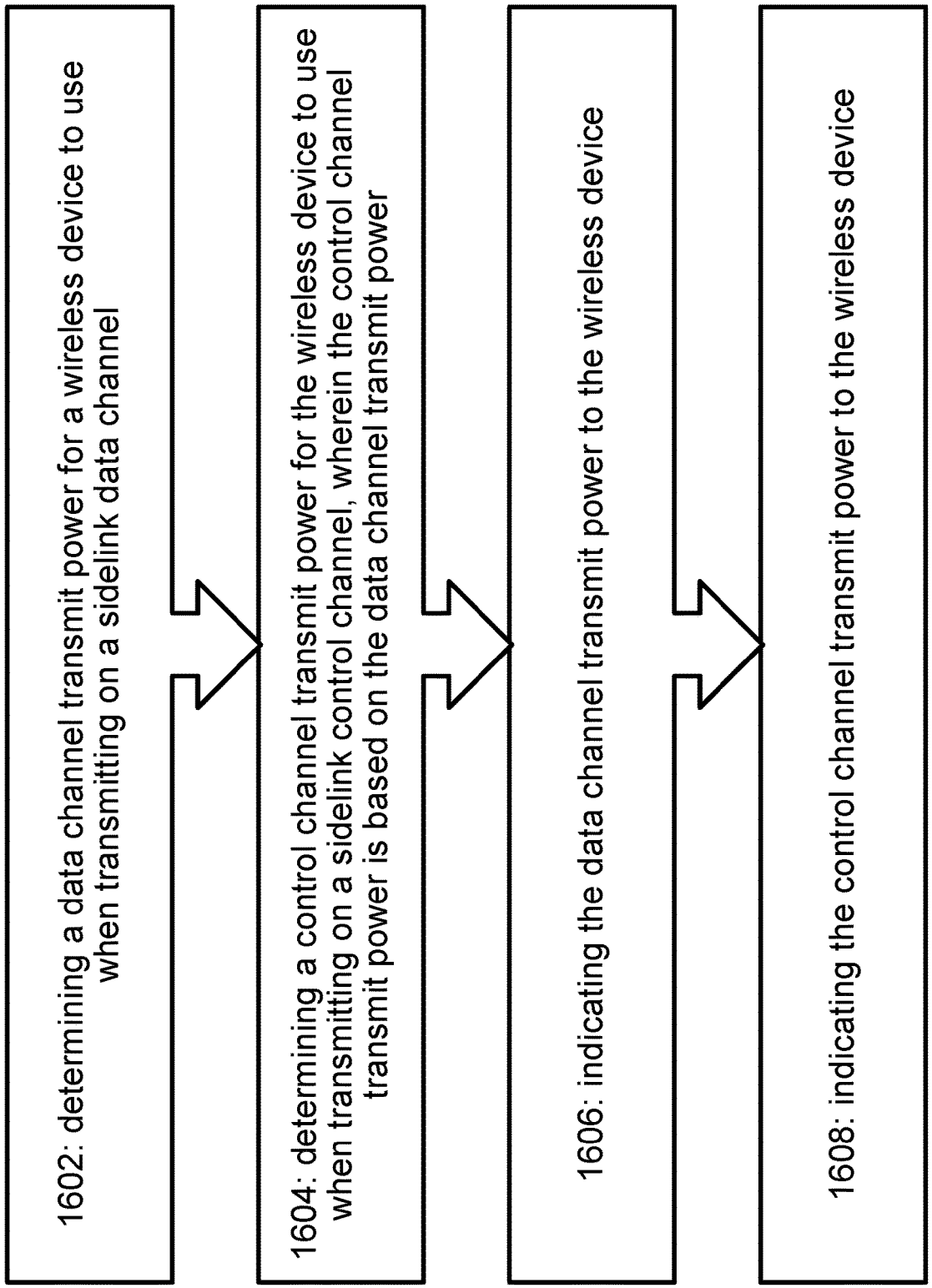
FIG. 16 is a flowchart illustrating a method performed by a network node that facilitates power control for a wireless device transmitting on a sidelink channel, in accordance with certain embodiments.

FIGS. 15, 16, and 17 illustrate examples of methods that may be performed by a network node, such as network node 160 discussed above. As an example, network node 160 may use processing circuitry 170 to carry out any of the methods. Examples of network nodes that may be used to implement the methods described include a radio network node, such as a base station (e.g., gNB), a relay node, or an MME, or a core network node. As discussed above, in Network-based Mode 1 (Mode 3 in LTE V2X), the network selects the resources and other transmit parameters assigned to sidelink UEs by means of scheduling grants. The network may select every transmission parameter, or the network may give the transmitter (e.g., wireless device) the freedom to select some of the transmission parameters, possibly with some restrictions.

FIG. 15 illustrates a method performed by a network node. At step 1502, the method begins with configuring a wireless device with one or more power control parameters that the wireless device uses to determine a data channel transmit power and a control channel transmit power for transmitting on a sidelink to a receiving wireless device.

In some embodiments, the one or more control parameters are used by the wireless device to determine a fractional path loss compensation. In some embodiments, the method further comprises setting a target energy per bit or target energy per resource element for the sidelink control channel. In some embodiments, the target energy per bit or target energy per resource element is independent from the fraction path loss compensation.

In some embodiments, the method further comprises configuring the wireless device with power intervals indicating possible values for the data channel transmit power.

The power intervals enable the wireless device to determine the control channel transmit power based on which power interval the data channel transmit power falls into. Examples of a wireless determining the control channel transmit power based on a power interval are described above with respect to FIG. 13. Examples of power intervals are further described above under the heading First set of embodiments: transmit power control of sidelink control channel (discussing power intervals [M0, M1], [M1, M2], . . . , [MN−1, MN], [MN, +infinity]).

Certain embodiments further comprise communicating a configuration that indicates an association of an MCS and a target transmission range that the wireless device is to use for transmitting to the receiving wireless device. The configuration enables the wireless device to determine the control channel transmit power based at least on the target transmission range and the determined MCS.

In some embodiments, the method further comprises configuring the wireless device with power intervals indicating possible values for the control channel transmit power. The power intervals enable the wireless device to determine the MCS for the control channel based on which power interval the control channel transmit power falls into. Examples of a wireless determining the MCS based on a power interval are described above with respect to FIG. 14. Examples of power intervals are further described above under the heading Second set of embodiments: other transmission parameters of control channel (discussing power intervals [K0, K1], [K1, K2], . . . , [KN−1, KN], [KN, +infinity]).

FIG. 16 illustrates a method performed by a network node. In some embodiments, the method begins at step 1602 with determining a data channel transmit power for a wireless device to use when transmitting on a sidelink data channel. As an example, the network node may determine the data channel transmit power based on power control parameters, information related to radio conditions (such as SNR, SINR, path loss), and/or other suitable information. In some embodiments, the network node may perform a calculation to determine the data channel transmit power.

The method proceeds to step 1604 with determining a control channel transmit power for the wireless device to use when transmitting on a sidelink control channel. The control channel transmit power is based on the data channel transmit power. Examples of how the control channel transmit power may be determined based on the data channel transmit power are discussed above with respect to step 1304 of FIG. 13. Analogous determinations may be performed by the network node at step 1604.

The method may further comprise indicating the data channel transmit power to the wireless device (step 1606) and indicating the control channel transmit power to the wireless device (step 1608). The data channel transmit power and the control channel transmit power may be indicated in the same signalling or in different signalling to the wireless device.

Although the previous example describes a method in which the network node determines and indicates to the wireless device both the data channel transmit power and the control channel transmit power, other embodiments use the network node to determine and indicate one of the transmit power values while allowing the wireless device to determine the other transmit power value (e.g., either autonomously or based on power control parameters or restrictions that the network node provides to the wireless device).

FIG. 17 illustrates a method performed by a network node. In some embodiments, the method begins at step 1702 with determining a data channel transmit power for a wireless device to use when transmitting on a sidelink data channel. As an example, the network node may determine the data channel transmit power based on power control parameters, information related to radio conditions (such as SNR, SINR, path loss), and/or other suitable information. In some embodiments, the network node may perform a calculation to determine the data channel transmit power.

The method proceeds to step 1704 with determining a control channel transmit power for the wireless device to use when transmitting on a sidelink control channel. The control channel transmit power is determined independently of the data channel transmit power. Examples of how the control channel transmit power may be determined independently of the data channel transmit power are discussed above with respect to step 1404 of FIG. 14. Analogous determinations may be performed by the network node at step 1704.

The method may further comprise indicating the data channel transmit power to the wireless device (step 1706) and indicating the control channel transmit power to the wireless device (step 1708). The data channel transmit power and the control channel transmit power may be indicated in the same signalling or in different signalling to the wireless device.

Although the previous example describes a method in which the network node determines and indicates to the wireless device both the data channel transmit power and the control channel transmit power, other embodiments use the network node to determine and indicate one of the transmit power values while allowing the wireless device to determine the other transmit power value (e.g., either autonomously or based on power control parameters or restrictions that the network node provides to the wireless device).

Any of the embodiments disclosed herein may be performed by a computer program, a computer program product, or a computer readable storage medium comprising instructions that when executed on a computer perform the steps disclosed herein. In further examples, the instructions are carried on a signal or carrier executable on a computer wherein when executed perform any of the steps disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a wireless device, the method comprising:
obtaining a data channel transmit power for transmitting on a sidelink data channel to a receiving wireless device;
obtaining a control channel transmit power for transmitting on a sidelink control channel, wherein the control channel transmit power is determined based on adding a boost value to the data channel transmit power, wherein the boost value depends on a calculation, the calculation based at least in part on an estimated path loss between the wireless device and the receiving wireless device, and
transmitting on the sidelink data channel at the data channel transmit power and on the sidelink control channel at the control channel transmit power.

2. The method of claim 1, wherein:
the control channel transmit power comprises:
determining the control channel transmit power at the wireless device or, receiving, from a network node, signaling that indicates the control channel transmit power, and
the data channel transmit power comprises:
determining the data channel transmit power at the wireless device, or
receiving, from a network node, signaling that indicates the data channel transmit power.

3. The method of claim 1, wherein:
possible values for the data channel transmit power are divided into power intervals; and the control channel transmit power is determined based on which power interval the data channel transmit power falls into.

4. The method of claim 3, wherein:
each of the power intervals corresponds to a respective boost value; and the control channel transmit power is determined based on adding a boost value to the data channel transmit power, the boost value corresponding to the power interval into which the data channel transmit power falls.

5. The method of claim 3, wherein:
each of the power intervals corresponds to a respective range of boost values; and the control channel transmit power is determined based on adding a boost value to the data channel transmit power, the boost value selected from the range of boost values corresponding to the power interval into which the data channel transmit power falls.

6. The method of claim 1, wherein the boost value is based on one or more of a modulation order, a coding rate, or a target transmission range of the sidelink control channel.

7. The method of claim 1 wherein the control channel transmit power is equal to the data channel transmit power when the data channel transmit power exceeds a predetermined threshold value.

8. The method of claim 1, wherein the data channel transmit power varies based on whether the sidelink data channel is multiplexed with the sidelink control channel.

9. The method of claim 1, further comprising reducing the data channel transmit power when a sum of the data channel transmit power and the control channel transmit power exceeds a maximum transmit power, the data channel transmit power reduced such that it is equal to or less than the difference between the maximum transmit power and the control channel transmit power.

10. The method of claim 1, wherein the transmitting comprises:
using a first group of one or more symbols to transmit on both the sidelink data channel and the sidelink control channel, the transmitting on the sidelink data channel transmitted at the data channel transmit power and the transmitting on the sidelink control channel at the control channel transmit power; and
using a second group of one or more symbols to transmit on only the sidelink data channel, the transmitting on the sidelink data channel at a second data channel transmit power determined by adding the data channel transmit power and the control channel transmit power,
wherein the first group of one or more symbols and the second group of one or more symbols are adjacent symbols within a same slot or subframe.

11. The method of claim 1, wherein the control channel transmit power is determined based on at least a target transmission range for the wireless device and a modulation and coding scheme (MCS) for transmitting to the receiving wireless device.

12. The method of claim 1, wherein:
the maximum transmit power varies over the duration of the transmission by the wireless device; and
the method further comprises adjusting the control channel transmit power as the maximum transmit power changes.

13. The method of claim 1, further comprising adjusting the MCS of the sidelink control channel based on the control channel transmit power.

14. A wireless device, the wireless device comprising processing circuitry operable to:
perform the steps of claim 1.

15. A method performed by a network node, the method comprising:
determining a control channel transmit power for a wireless device to use when transmitting on a sidelink control channel, wherein the control channel transmit power is based on a data channel transmit power that the wireless device is to use when transmitting on a sidelink data channel, wherein the control channel transmit power is determined based on adding a boost value to the data channel transmit power, wherein the boost value depends on a calculation, the calculation based at least in part on an estimated path loss between the wireless device and a receiving wireless device; and
indicating the control channel transmit power to the wireless device.

* * * * *